United States Patent
Quake et al.

(10) Patent No.: US 7,262,923 B2
(45) Date of Patent: *Aug. 28, 2007

(54) MICROFABRICATED LENSES, METHOD OF MANUFACTURE THEREOF, AND APPLICATIONS THEREFOR

(75) Inventors: Stephen R. Quake, Stanford, CA (US); Yann Gambin, Paris (FR)

(73) Assignee: California Institute of Technology, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/372,156

(22) Filed: Mar. 8, 2006

(65) Prior Publication Data

US 2006/0171025 A1     Aug. 3, 2006

Related U.S. Application Data

(62) Division of application No. 10/825,567, filed on Apr. 15, 2004, now Pat. No. 7,038,856, which is a division of application No. 10/265,291, filed on Oct. 4, 2002, now Pat. No. 6,841,096.

(60) Provisional application No. 60/329,469, filed on Oct. 8, 2001.

(51) Int. Cl.
   *G02B 21/02*       (2006.01)

(52) U.S. Cl. ................. 359/661; 359/368; 359/664

(58) Field of Classification Search ............. 359/368, 359/661, 664

See application file for complete search history.

(56) References Cited

U.S. PATENT DOCUMENTS

| | | | |
|---|---|---|---|
| 2,764,061 | A | 9/1956 | Kinder et al. |
| 4,634,234 | A | 1/1987 | Baumann |
| 5,004,307 | A | 4/1991 | Kino et al. |
| 5,729,393 | A | 3/1998 | Lee et al. |
| 5,776,191 | A | 7/1998 | Mazzocco |
| 5,936,782 | A | 8/1999 | Nomura et al. |
| 5,939,709 | A | 8/1999 | Ghislain |
| 6,181,478 | B1 | 1/2001 | Mandella |
| 6,270,696 | B1 | 8/2001 | Jain et al. |
| 6,301,055 | B1 | 10/2001 | Legrand et al. |
| 6,324,149 | B1 | 11/2001 | Mifune et al. |
| 6,369,957 | B1 | 4/2002 | Ishida |
| 6,594,430 | B1 | 7/2003 | Rausch et al. |
| 6,608,726 | B2 | 8/2003 | Legrand et al. |
| 7,038,856 | B2 * | 5/2006 | Quake et al. .............. 359/661 |

FOREIGN PATENT DOCUMENTS

JP        2000-89004       3/2000

* cited by examiner

*Primary Examiner*—Mark A. Robinson
(74) *Attorney, Agent, or Firm*—Townsend and Townsend and Crew LLP

(57) ABSTRACT

Microfabricated lenses, e.g., solid immersion lens (SIL) structures, are provided along with techniques for constructing these lens structures, as well as selected applications of such lens structures.

3 Claims, 27 Drawing Sheets

MICROFABRICATED LENSES, METHOD OF MANUFACTURE THEREOF, AND APPLICATIONS THEREFOR

CROSS-REFERENCE TO RELATED APPLICATIONS

This application is a divisional application of U.S. patent application Ser. No. 10/265,291, filed Oct. 4, 2002 now U.S. Pat. No. 6,841,096 which claims the benefit of U.S. Patent Application Ser. No. 60/329,469, filed Oct. 8, 2001, which are hereby incorporated by reference in their entirety.

TECHNICAL FIELD

The present invention relates to microfabricated lenses, e.g., solid immersion lens (SIL) structures, and in particular to techniques for constructing these lens structures, as well as selected applications of such structures.

BACKGROUND OF THE INVENTION

Lenses are used to focus light in a variety of applications. For example, micro-structures, such as cells, are observed with light focused in microscopes. Lenses focus light by bending it according to the law of refraction. The law of refraction states that the change in angle (refraction) of a light ray as it passes from one material into another material is related to a material property called the index of refraction and the angle the light makes with the interface between the two materials. The index of refraction is a measure of the speed of light in the material. Lenses that are used in microscopes are specifically designed to bend light which has been reflected by small specimens so that their images appear magnified.

Lenses that are used in microscopes are normally at least a few millimeters away from the specimen. Light from the lens travels through air before being focused on the specimen that is to be imaged. Because air has a relatively low index of refraction, the degree of features that can be seen on the specimen is limited. In view of this, oil, which has a medium index, is placed between the microscope lens and the specimen. This change in the index of refraction of the medium permits slightly smaller features to be seen on the specimen relative to those features on the specimen that are seen when air is the medium. This is called oil immersion microscopy.

In order to achieve even greater performance, light is focused through a high-index solid held in contact with the specimen. This is called solid immersion microscopy. In order to produce a suitable solid immersion lens, the lens must have a high index of refraction. One possible material for constructing this type of lens is silicon, whose index of refraction is approximately 1.41 as compared to 1.00 for air. In addition, the solid immersion lens must be held in contact with the specimen under examination without causing damage to specimens, such as cells.

Due to the limitations on resolutions obtainable with conventional optical lenses for applications such as microscopy, techniques have been developed to decrease the Rayleigh limit on transverse resolution C. The Rayleigh limit is generally understood as being the minimum distance that two particles may be separated and still be distinguished. The Rayleigh limit is given by $\delta = 0.82\lambda/(NA)$ where $\lambda$ is the wavelength and NA is the numerical aperture of the focusing objective (NA=$n \sin(\theta)$), where n is the refractive index of the medium, and $\theta$ is the angle between the outermost rays focusing on the sample and the optical axis). Generally, the numerical aperture is a measure of the resolving power of the microscope objective. It is a measure of the optical performance of the system and concerns the specific ability to differentiate small features and the light gathering capability of the system. Whether the NA is considered to be low or high depends upon the type of optical system that is being used. For example, a high NA for a high powered microscope (e.g., 60× objective oil immersion lens) would be about 1.40.

Coherent light such as laser light can be used to precisely control the wavelength of illumination $\lambda$. One way to decrease the transverse resolution is to increase the index of refraction of the optical medium, such as by use of oil-immersion microscopy or use of a solid immersion lens.

If an SIL is placed in contact with the sample under examination, illumination can be more readily focused on it, and use of the high NA of the system allows efficient collection of the excitation light with high optical transmission efficiency and observation of the sample with a very high resolution. In most of the cases, the SIL is used primarily for near-field microscopy, where the air gap between the SIL and the sample oblige those who do not want to use evanescent waves to work with a NA smaller than one.

A problem with the SIL technology is the complexity of its manufacture. For example, a polished glass sphere provided with a sequence of progressively finer alumina powders, requires a polishing time typically of many hours. Furthermore, the result is not perfect, and the polished surface is slightly rounded. Moreover, known lens structures in SIL configurations involve objective lens sets that are self contained and thus are difficult to use in a manner that maintains the lens in immersion contact with the object under observation.

What is needed is a method for simple, inexpensive and rapid construction of microfabricated lenses, including solid immersion lenses, and a lens structure which is suited for low-cost, even disposable usage and for micro-size applications which conventional lenses have been unable to achieve.

SUMMARY OF THE INVENTION

Mircofabricated lenses, such as a solid immersion lens structure, are formed of an optically clear low temperature moldable material such an elastomer cast to a desired shape and smoothness in a pliant mold which has highly undercut margins. The level that the margins are undercut will vary from application and depends upon the type of lens structure which is to be formed from the mold. As the margins are undercut more and more, the lens that is to be formed has a more defined hemispherical shape.

Further, an exemplary method for construction of a microfabricated lens, such as a solid immersion lens structure or a meniscus type lens, includes providing a pliant mold defining a lens-shaped cavity in which the lens is cast, casting a liquid material into the lens cavity, permitting the liquid material to set to form the lens portion of the lens and removing the lens portion from the pliant mold. A specific material for use in forming the microfabricated lens is a thermally-resilient deformable material such as optically-clear silicon elastomer of a refractive index n greater than 1.2 and preferably greater than 1.4, such as a room temperature vulcanization (RTV) elastomer, specifically General Electric RTV 615. Preferably, the mold itself may be constructed of this material and the microfabricated lens structure can be a rigid setting material. The lens structures produced according to the exemplary molding method can be a disposable lens element and/or a light collection element integrated with a specimen carrier of a microfabricated flow cytometer, just to name a few of the many potential applications for the microfabricated lenses.

Two microfabricated lenses that are of particular interest are a solid immersion lens having improved light collection/focusing properties and a lens of a meniscus type. Advantageously, the present manufacturing process yields inexpensive optical elements, such as an SIL lens structure, as compared to conventional lenses. Further, the lens portion of the SIL lens structure is integrally formed with the sample carrier and this permits the complete SIL lens structure to be disposable. The meniscus type lens has a lens portion which has a convex surface on one side and a concave surface of the other side. As with the SIL lens structure, the meniscus type lens is configured to have improved optical properties as a result of the present manufacturing process. The lens portion of the meniscus type lens is configured to capture a very large solid angle of illumination and acts to further and more completely redirect light to a detection element or the like. The meniscus type lens is particularly tailored to be used in combination with the SIL structure and this lens combination results in the enhancement of the numerical aperture (NA) of the optical system.

Further according to the invention, a method is provided for imaging an object using a low cost lens element in an SIL configuration. According to this method, an object to be observed, preferably immersed in fluid, is guided along a passage defined by an integrally molded-together body portion and a solid immersion lens portion, where the solid immersion lens portion is optically aligned with a position in the passage. The object is positioned in the passage in alignment with the solid immersion lens portion so that the object is within a field of view extending through the spherical solid immersion lens portion. The object, immersed in a fluid of high index of refraction, is viewed through the spherical solid immersion lens portion of an even higher index of refraction, and the object is imaged onto a viewing surface. The combined use of the SIL lens structure with the meniscus type lens further enhances the imaging performance of the optical system.

One exemplary imaging system that illustrates the benefits provided by using an optical system incorporating the SIL lens structure and the meniscus type lens is a miniature microscope that is integrally formed with a micro-sized workstation, i.e., a microfluidic chip. In such an application, a miniature monolithic optical system is constructed and includes not only the SIL lens/meniscus type lens combination but also other ordinary lenses. These ordinary lenses are preferably formed using a molding process similar to that which is used to form SIL lens structure and the meniscus type lens. The ordinary lenses can be of any number of constructions (e.g., convex, concave, plano-convex, etc.) and have a variety of dimensions. The SIL lens structure is aligned with respect to one of micro-channels formed in the microfluidic chip and the meniscus type lens is aligned with respect to the SIL lens structure. Other lenses are then arranged so that light from source is focused onto an observation region (i.e., a micro-channel) of the SIL lens structure. The configuration of the SIL lens structure acts to enhance the numerical aperture and the menscius type lens acts to even greater enhance the numerical aperture (NA) due to its construction and its positioning relative to the SIL lens structure. An imaging system constructed in this manner is characterized as having greatly improved resolution and magnification as compared to conventional lens systems.

Further, a method is provided for collecting light emissions with high efficiency through a low cost lens element in an SIL configuration. An object to be observed is immersed in fluid and positioned in alignment with the solid immersion lens portion so that the object is within a field of light collection extending through very large numerical aperture spherical solid immersion lens portion. The object, immersed in a fluid of high index of refraction, emits observable optical energy typically by fluorescence in response to excitation, and the emissions at selected wavelengths are collected through the spherical solid immersion lens portion of an even higher index of refraction and directed to a sensor, typically without imaging, so that the emissions can be measured. The structure admits to high collection efficiency. Once again, the use of the meniscus type lens in combination with the SIL lens structure further enhances the obtained benefits.

The invention will be better understood by reference to the following detailed description and the accompanying diagrammatic drawings.

BRIEF DESCRIPTION OF THE DRAWINGS

FIGS. 23-28A show cross-sectional views illustrating further steps for producing the meniscus type lens after the steps of FIG. 22A-22C are performed;

DESCRIPTION OF SPECIFIC EMBODIMENTS

Figure 1:
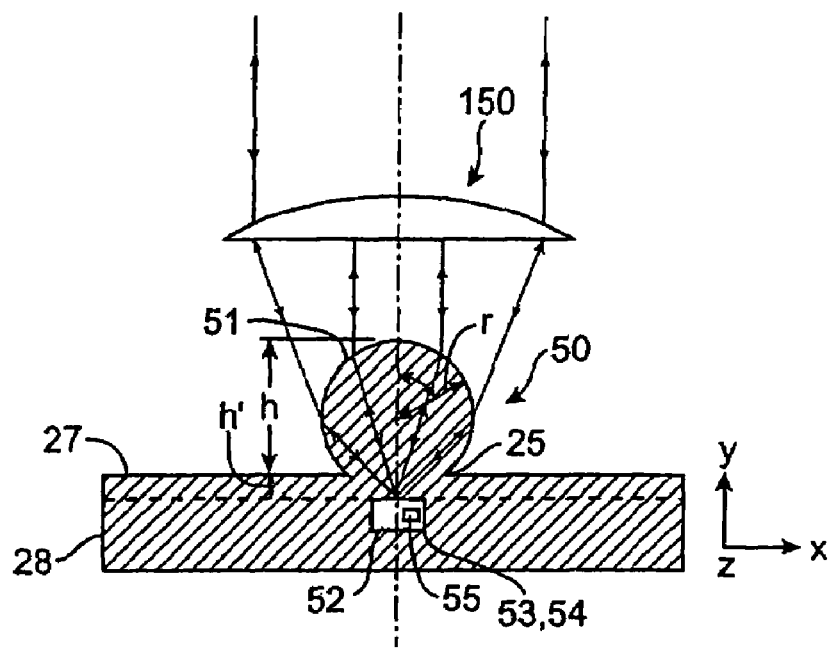
FIG. 1 shows a schematic cross-sectional view of a solid immersion lens structure according to one embodiment.

In order to understand the invention, it is helpful to define the terms associated with a solid immersion lens SIL structure 50 as it might be used in a device such as a microscope, spectroscope or cytometer. FIG. 1 illustrates the functioning of a solid immersion lens, with indication of the parameters used to describe the structure and operation. A solid immersion lens portion 51 comprises a sphere of radius r and index of refraction $n_s$. It is disposed at a highest height h above a surface 27 of a body portion 28 so that a boundary margin 25 is formed which is narrower in diameter than the diameter of the lens portion 51. An observation region 52 is provided at a distance h' from the surface 27. Samples are placed in the region for observation according to the intended application, such as microscopy, spectroscopy or cytometry. Also shown with the structure 50 is a collection/collimating lens 150. The spherical structure and collection configuration admits to construction of lens systems having a numerical aperture higher than unity, which is particularly useful for ultrasensitive spectroscopy.

Figure 2:
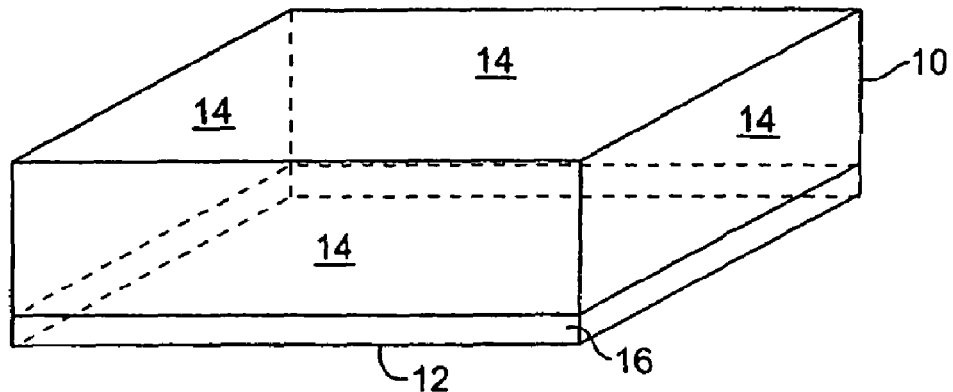
FIG. 2 shows a schematic three-dimensional view of an initial step in a method for producing a solid immersion lens structure in accordance with a first embodiment.
Figure 3:
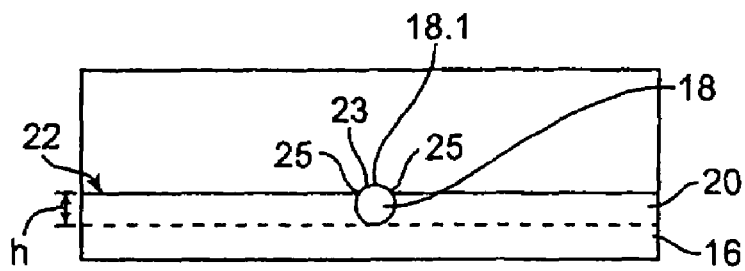
FIG. 3 shows a cross-sectional view corresponding to FIG. 2 indicating further steps of producing a solid immersion lens structure.

A method for producing a solid immersion lens structure in accordance with the invention is described with reference to FIGS. 2-4. Referring to FIG. 2, a container 10, typically in the form of a shallow dish defining a base wall 12 and four peripheral upstanding sidewalls 14 provides the housing for a mold. To produce the solid immersion lens structure in accordance with the method of the invention, a mold is formed. To form the mold, a first layer 16 of moldable material from which the mold is to be formed is cast into the container 10. The first layer 16 is then permitted to set. Referring now to FIG. 3, once the first layer 16 has set, a mold core 18 is positioned in the container 10 on the first layer 16. In this instance the mold core is a spherical bead of uniformly smooth surface, such as a steel bead of radius r=~0.8 mm-4.5 mm. A second layer 20 of moldable material is then cast into the container of height h=~1 mm-5 mm partially to encapsulate the mold core 18, thereby to form a second layer of moldable material 20 immediately adjacent the first layer 16. The second layer 20 defines an upper surface 22 at height h such that an upper portion 18.1 of the generally spherical mold core 18 protrudes through an orifice 23 of diameter d from the upper surface 22 and creates highly undercut margins 25 around the orifice 23. In order for the mold to be reusable where the structure has such undercut margins, the second layer, according to the invention, must be of a pliant material such as a silicon elastomer, such as a room temperature vulcanization (RTV) elastomer, specifically General Electric RTV 615.

The constraint on the height h is given by the following relation (I):

$$r(1-\cos \Phi) < h < r + r/n_s$$

where r is the radius of the sphere, h is the height of the layer, $\Phi$ is the polar angle from the center of the sphere to the edge of the orifice formed by the undercut margins, $n_s$ is the index of refraction of the material which forms the lens.

Thus the geometric details of the mold depend upon the thickness of the second layer 20 relative to the radius of the bead. The RTV an elastomer made by mixing polymers, cross linkers and a catalyst. While it cures at room temperature, it is typically set for two hours at a slightly elevated temperature of 80° C. The preferred RTV comprises a first part of a polydimethylsiloxane bearing vinyl groups and a platinum catalyst and a second part of a cross linker containing silicon hydride (Si—H) groups. Once mixed, the silicon hydride groups form a covalent bond with the vinyl groups.

Figure 4:
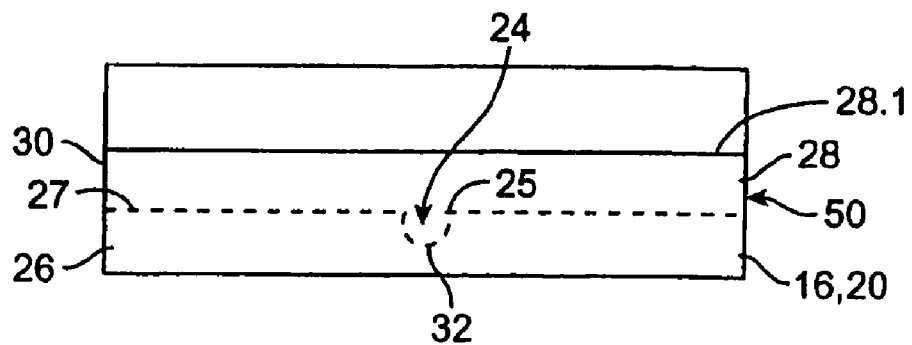
FIG. 4 shows a cross-sectional view corresponding to FIG. 3 showing a subsequent step in a method of producing a solid immersion lens structure.

Referring to FIG. 4, once the layer 20 has set, the mold core 18 is removed so as to define a lens cavity 24. In this manner, a mold 26 for producing a solid immersion lens structure, in accordance with the invention, is produced. To minimize the chance of bonding between the mold and the lens, the surface is treated with an oxygen plasma to form an anti-adhesive layer 27. For example, oxidized RTV blocks bonding so the molded lens can be removed from the lens cavity 24.

Still referring to FIG. 4 and to FIG. 1, the solid immersion lens structure 50 is produced by casting a moldable material into the lens cavity 24. The moldable material from which the solid immersion lens portion of the solid immersion lens structure is to be formed is typically cast into the container 10 to fill not only the lens cavity 24, but also to form a layer 28 in the container 10, the layer 28 defining an upper surface 28.1 above (as shown) the lens cavity 24. The thickness h' above the surface 27 is given by the relation (1A):

$$h'=r+r/n_s-h.$$

The layer 28 forms a body portion of the solid immersion lens structure 50 when the moldable material of layer 28 has set. In this manner, the body portion of the solid immersion lens structure is integrally molded together with the solid immersion lens portion 51.

When the layer 28 has set, the solid immersion lens structure in accordance with the invention, which includes a body portion 30 and a solid immersion lens portion 32 is formed. The solid immersion lens structure is then removed from the mold.

The material from which the SIL structure 50 is made in mold 26 may be of any suitable optically clear material that can be cast as a liquid at a temperature less than the temperature at which the mold 26 is damaged or otherwise undesirably deformed. The SIL structure may cure to a generally rigid solid or a pliant solid. Among the materials considered to be generally suitable are low temperature of formation polymers, room temperature vulcanization elastomers, low temperature of formation epoxies, polyimides, polycarbonates and photoresists. The lens material 50 can be a pliant silicon elastomer. A suitable silicon elastomer is General Electric RTV 615, the same material used to create the mold 26 itself.

As is clear from FIG. 4, the lens cavity 24 has a transverse dimension greater than the traverse dimension of a orifice 23 of the cavity 24. The moldable material from which the mold 26 is made is deformable so that when the moldable material from which the solid immersion lens structure 50 in accordance with the invention is made, has set, and is removed from the mold 26, a region of the mold 26 adjacent the mouth is permitted to deform thereby to permit the solid immersion lens portion to pass therethrough.

Referring now to FIG. 1, a solid immersion lens structure, generally indicated by reference numeral 50, is indicated. The structure 50 has been formed in accordance with the method of the invention as described above with reference to FIGS. 2-4 of the drawings. In addition, the structure 50 has been formed to define a sample observation region 52 in a passage extending therethrough. This passage may be formed in any suitable manner, such as by positioning an elongate mold core in the layer 28, with reference to FIG. 4, prior to the moldable material defining layer 28 having set. The elongate mold core from which the passage 52 is formed can be of a material which disintegrates when exposed to a suitable agent. Accordingly, when the structure 50 has been formed, the core can be removed by exposing it to the suitable agent thereby to remove the core from the structure 50 and to yield the hollow region 52. Alternatively, the region 52 can be formed in any one of the ways described in Applicants' co-pending patent application Ser. No. 09/605,520 filed Jun. 27, 2000. For example the region 52 can be formed as part of a two-step construction process whereby the height h' is precisely defined during the first step and then the passage and a body portion is added as a second step.

Figure 5:
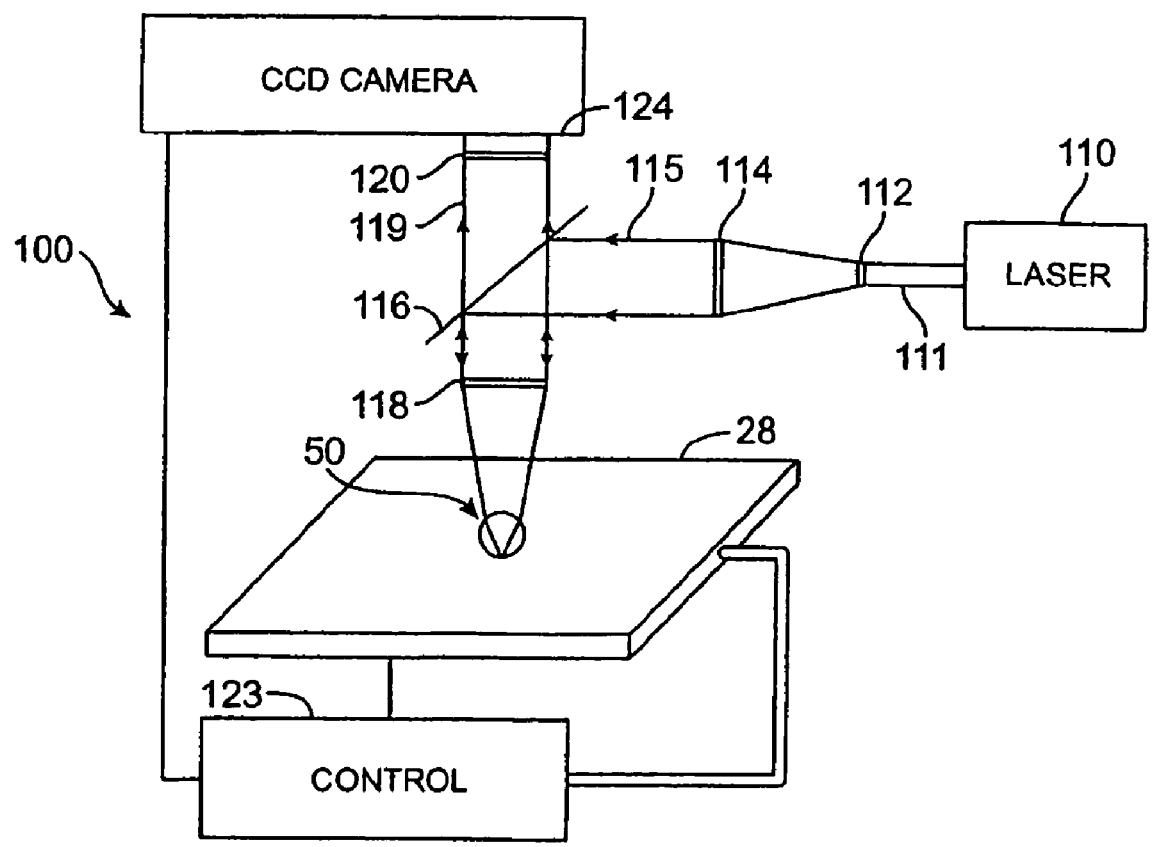
FIG. 5 shows an imaging system comprising a solid immersion lens structure in accordance with one embodiment.

FIG. 5 is illustrative of an imaging system 100 employing an SIL 50 in accordance with the invention. An example is a microscope. The system includes a laser 110 projecting a beam 111, an expansion lens 112, a first collimating lens 114, a partially transmissive mirror 116, a second collimating lens 118, an SIL structure 50, a focusing lens 120, an image detector such as a CCD camera 124 and a control apparatus 123. In operation, the laser 110 projects an illumination beam 111 through expansion lens 112 and collimating lens 114 to produce a broad coherent monochromatic illumination beam 115. The beam 115 is reflected by mirror 116 to second collimating lens 118 through which it is focused through an air medium to the SIL structure 50. Focus adjustment is by means of positioning of the second collimating lens 118 relative to the SIL structure 50. The SIL structure 50 further focuses to a spot in the sample chamber (not shown) within the body portion, in immersion contact with the lens. The sample is positioned by the control apparatus 123. (The control apparatus 123 may both position a platform and supply the object or sample to be viewed.) Light reflected from the object is directed back through the second collimating/focusing lens 118 which focuses to infinity and directs the image 119 through the half silvered mirror 116 to a third focusing/collimating lens 120. The third focusing/collimating lens 120 focuses the image as magnified onto an image sensor 124, such as a CCD array of a CCD camera. The relative positioning of the lens 120 and the image sensor 124 determines focus of the image. Other microscope configurations may be employed as suggested by this configuration. Significantly, the SIL structure 50, although an essential element of the optical system is obtained from a manufacturing process which yields extremely inexpensive optical elements as compared to conventional lenses, so the SIL structure 50, which is integral with the sample carrier, is disposable. This is believed to be a significant advance over conventional SIL technology. This also presents significant practical advantages over methods using oil immersion objectives. It is not necessary to use oil between the lens and sample since they are integrally molded. In addition, an oil immersion objective must be positioned with high accuracy with respect to the sample. However, a solid immersion lens can be fabricated as the appropriate distance away from the sample so that focal precision would be needed to adjust the distance between an oil immersion lens and the sample.

Figure 6:
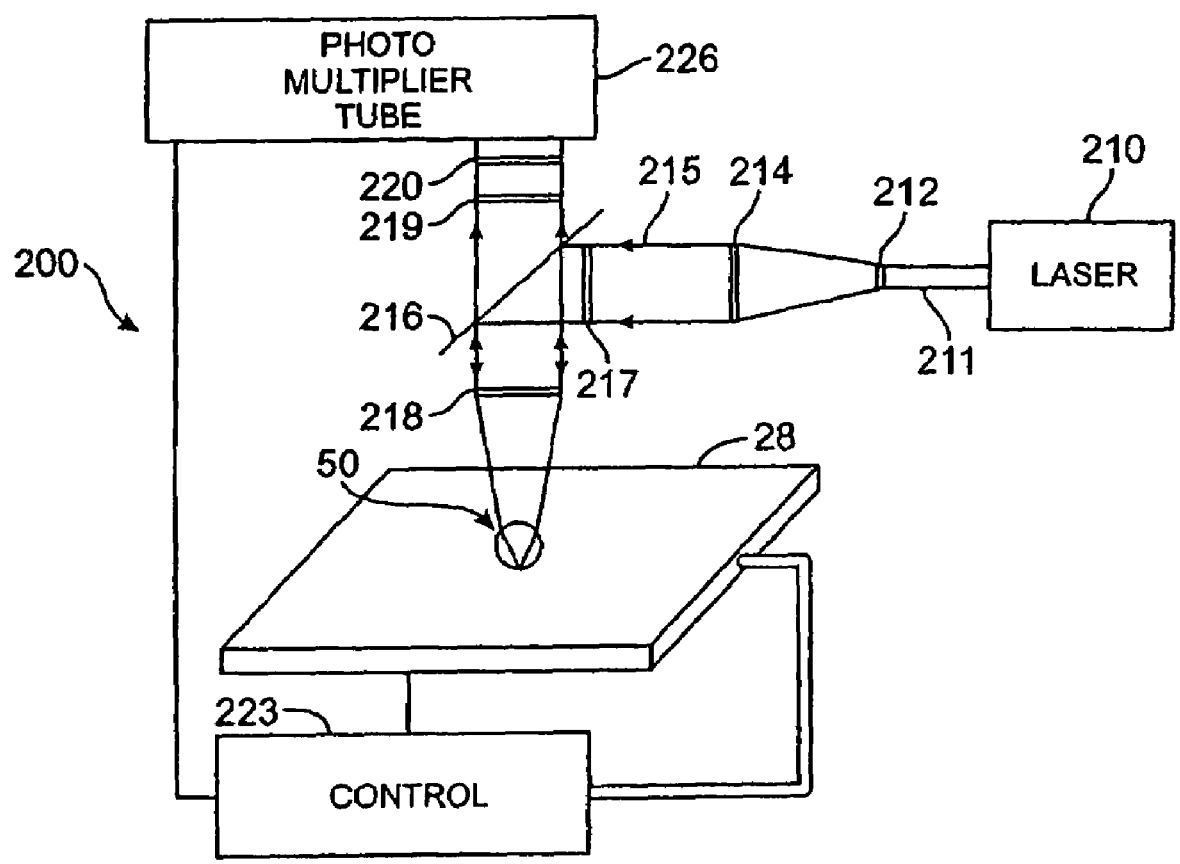
FIG. 6 shows an emission collection system comprising a solid immersion lens structure in accordance with one embodiment.

FIG. 6 is illustrative of a light collection system 200 employing an SIL 50 in accordance with the invention. An example is a cytometer or a highly efficient spectrometer. The system 200 includes a laser 210 projecting a beam 211, an expansion lens 212, a first collimating lens 214, an optional first dichroic filter 217 selected for passing the selected output wavelength of the laser 210, a partially transmissive mirror 216, a second collimating lens 218, an SIL structure 50, a second dichroic filter 219 selected for passing the selected emission of the sample, a collection lens 220, a photon collection device such as a photomultiplier tube 226 and a control apparatus 223. In operation, the laser 210 projects an illumination beam 211 through expansion lens 212 and collimating lens 214 to produce a broad coherent monochromatic illumination beam 215. Its purity is further selected by filter 217 so that the illumination can be used as an excitation probe. The beam 215 is reflected by mirror 216 to second collimating lens 218 through which it is focused through an air medium to the SIL structure 50.

Focus adjustment is by means of positioning of the second collimating lens 218 relative to the SIL structure 50. However, as an emission collection apparatus, imaging is not the goal. The SIL structure 50 further concentrates the illumination to in the sample chamber (not shown) within the body portion, in immersion contact with the lens. The sample is excited by the illumination and positioned by the control apparatus 223. (The control apparatus 223 may both position a platform and supply the object or sample to be viewed.) The illumination excites the sample to cause it to emit fluorescent energy which is collected by the high numerical aperture lens and is directed back through the second collimating lens 218 which focuses to infinity and directs the emitted photonic energy through the half silvered mirror 216 to the second filter 219, which blocks any stray excitation, and then through the third collimating lens 220. The third collimating lens 220 concentrates the photonic energy into a collection region of a photon sensor such as a photomultiplier tube (PMT) 226. The relative positioning of the lens 120 and the PMT 226 the collection efficiency. This application is believed to be a new application of an SIL structure. Other configurations may be employed as suggested by this configuration. Significantly, the SIL structure 50, although an essential element of the optical system is obtained from a manufacturing process which yields extremely inexpensive optical elements as compared to conventional lenses, so the SIL structure 50, which is integral with the sample carrier, is disposable. This is believed to be a significant advance over conventional SIL technology.

Figure 7:
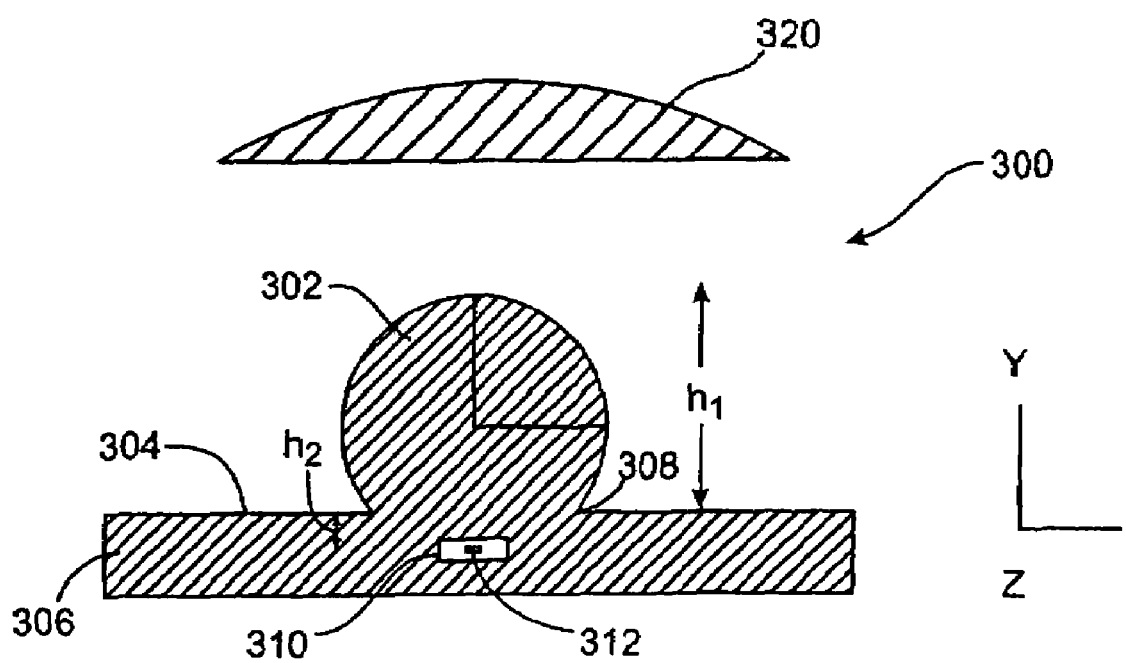
FIG. 7 shows a schematic cross-sectional view of a solid immersion lens structure according to another embodiment.

With reference to FIG. 7, a solid immersion lens SIL structure 300 according to another exemplary embodiment is illustrated. The SIL structure 300 is essentially identical to the SIL structure 50 in the manner that it functions as a solid immersion lens. The SIL structure 300 includes a solid immersion lens portion 302 in the form of a sphere of radius r and index of refraction $n_s$. The solid immersion lens portion 302 is disposed at a highest height hi above an upper surface 304 of a body portion 306 so that a boundary margin 308 is formed. The boundary margin 308 is narrower in diameter than the diameter of the lens portion 302. An observation region 310 is formed in the body portion 306 and is preferably centrally located underneath the lens portion 302. The observation region 310 is formed at a distance $h_2$ from the upper surface 304. Samples, i.e., specimens, are placed in the observation region 310 according to the intended application of the SIL structure 300. Exemplary applications include but are not limited to microscopy, spectroscopy, cytometry, and in one particular application, which will be described in great detail hereinafter, the SIL structure 300 forms a part of a miniature microscope which is adapted to be integrated into a microfluidic workstation.

The observation region 310 can be in the form of a transverse passage provided in the body portion 306 such that a portion of the passage extends underneath the lens portion 302 so that a sample in the passage can be positioned directly underneath the lens portion 302. In this embodiment, the passage includes an inlet leading into the passage and an outlet leading from the passage. A liquid supports an object 312 in the passage with the liquid being pumped or otherwise directed through the inlet and along the passage causing the object 312 to pass through the inlet and along the passage in the direction of the z-axis. The liquid is then discharged through the outlet.

The SIL structure 300 is designed so that it can be used in combination with other lenses in an optical system. For example, FIG. 7 illustrates the SIL structure 300 being used in combination with a collection/collimating lens 320. The spherical structure of the SIL 300 and the illustrated collection configuration admits to construction of a lens system having a numerical aperture higher than unity. This is particularly advantageous and useful for ultrasensitive spectroscopy.

Figure 8:
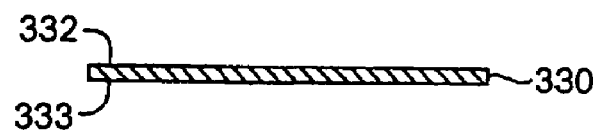
FIG. 8 shows a cross-sectional view of an initial step in a method for producing a solid immersion lens structure in accordance with a second embodiment.
Figure 9:
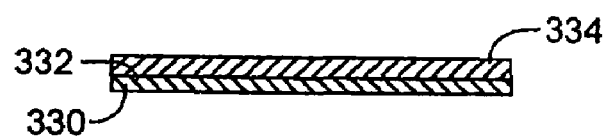
FIGS. 9-11 show cross-sectional views illustrating further steps for producing the solid immersion lens structure after the step of FIG. 8 is performed.

A method for producing the SIL structure 300 is described with reference to FIGS. 8 through 16. Referring to FIG. 8, a substrate 330 is provided and includes a first surface 332 and an opposing second surface 333. The first surface 332 should be of a planar construction and in one exemplary embodiment, the substrate 330 is a silicon wafer or other rigid structure. The substrate 330 functions as a foundation for fabrication of a mold which is used to form the SIL structure 300. Preferably, the substrate 330 undergoes conventional cleaning operations to ensure that it is of high quality and without foreign matter. To form the mold, a first layer 334 of moldable material from which the mold is to be formed is cast on the first surface 332 of the substrate 330, as shown in FIG. 9. The first layer 334 is preferably formed to have a uniform thickness and is free of any imperfections such as bubbles, etc. Suitable techniques, such as spin coating, are preferably used so as to create a uniform thickness for the first layer 334 and remove any imperfections. The first layer 334 is then permitted to set. In one exemplary embodiment, the first layer 334 is of a pliant material, such as a room temperature vulcanization (RTV) elastomer. One particularly preferred RTV is commerically available under the trade name RTV 615 from General Electric.

Figure 10:
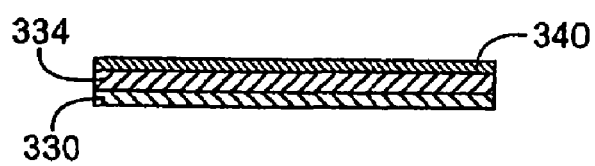

Referring now to FIG. 10, once the first layer 334 has set, a second layer 340 of moldable material is cast on the first layer 334. The second layer 340 is preferably formed to have a uniform thickness. The second layer 340 is also formed of a pliant material, such an RTV elastomer, and preferably, the first layer 334 and the second layer 340 are formed of material that is supplied from the same source. In one exemplary embodiment, the first and second layers 334, 340 are formed of the same material. For example, General. Electric RTV 615 is preferably used to form the first and second layers 334, 340.

The precise thickness of the second layer 340 depends upon the radius of a spherical mold core 350 (FIG. 11) that is used to form the mold. More specifically, the second layer 340 is formed on the first layer 334 to a height $h_3$ so as to partially encapsulate the mold core 350 when the mold core 350 is positioned in the second layer 340 (See FIG. 12A). In one exemplary embodiment of FIG. 12A, the height $h_3$ of the second layer 340 is about 260 microns based upon the second layer 340 having an initial thickness of 30 microns and the mold core 350 having a radius of 150 microns. It will be understood that the above-recited value of $h_3$ is merely exemplary and this value will vary from application to application as a function of several parameters, such as the initial thickness of the second layer 340 and the radius of the mold core 350. Furthermore, the constraint on the height $h_3$ is given by the aforementioned relation (I). Thus, it will be appreciated that the geometric details of the mold depend upon the thickness of the second layer 340 relative to the radius of the spherical mold core 350. Preferably, techniques, such as spin coating, are used when casting the second layer 340 on the first layer 334 to ensure that the second layer 340 has a uniform thickness.

Figure 11:
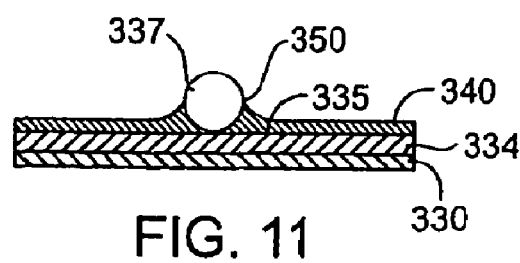

Referring now to FIGS. 10 and 11, the mold core 350 is positioned by placing it in a central region of the second layer 340. The mold core 350 is preferably a spherical bead of uniformly smooth surface. The mold core 350 is not limited to having a spherical shape as it can have another shape, such as elliptical, etc. The selection of the mold core 350 will depend upon the precise application and the radius can be a micro-size (e.g., 150 microns) or it can be a larger value such as 4.5 mm or any value therebetween. The spherical mold core 350 may be formed of a number of materials, including steel, sapphire and ruby. Sapphire and ruby micro spheres are available in micro sizes and have been used in different optics applications, such as fiber coupler and other optics applications. Sapphire and ruby spherical beads are both made from aluminum oxide ($Al_2O_3$) and their physical and chemical properties are essentially the same. Both have a low coefficient of expansion ($8.4*10^{-6}/°$ C.), good sphericity (0.64 micron) and a low diameter tolerance (+/−2.54 microns). Because the dimensions of the spherical mold core 350 can be very small, e.g., 150 microns, ruby has one advantage in that its red color makes it easier to detect and therefore easier to handle.

Upon the positioning of the spherical mold core 350 in the second layer 340 prior to the second layer 340 setting, surface tension causes the material of the second layer 340 to cover a portion of the spherical mold core 350. With ever increasing surface tension, the material of the second layer 340 will travel further up the spherical surface of the mold core 350 toward an upper portion thereof, thereby covering more of the surface of the mold core 350.

One aspect of the present mold manufacturing method is intended to greatly reduce or eliminate the disadvantages associated with the surface tension phenomena. The material forming the second layer 340 is subjected to a pre-curing process. In the pre-curing process, the material of the second layer 340 is heated to a predetermined temperature and for a predetermined period of time. The polymers of the RTV material are sensitive to temperature and the properties of the RTV material are therefore influenced by heating. The pre-curing process causes reticulation of polymer chains and a change in the bond structure of the polymers and this results in a change in the viscosity of the RTV material. More specifically, the pre-curing process induces cross-linking into the polymer chains. The polymer chain become larger resulting in it being more difficult to bring the molecules together at the interference between the liquid polymers and air. This requires more energy to be expended and therefore results in a reduction in the surface tension. By increasing the viscosity of the RTV material, less material will be drawn to the spherical mold core 350 and therefore less RTV material covers the spherical mold core 350.

Figures 12A, 12B:
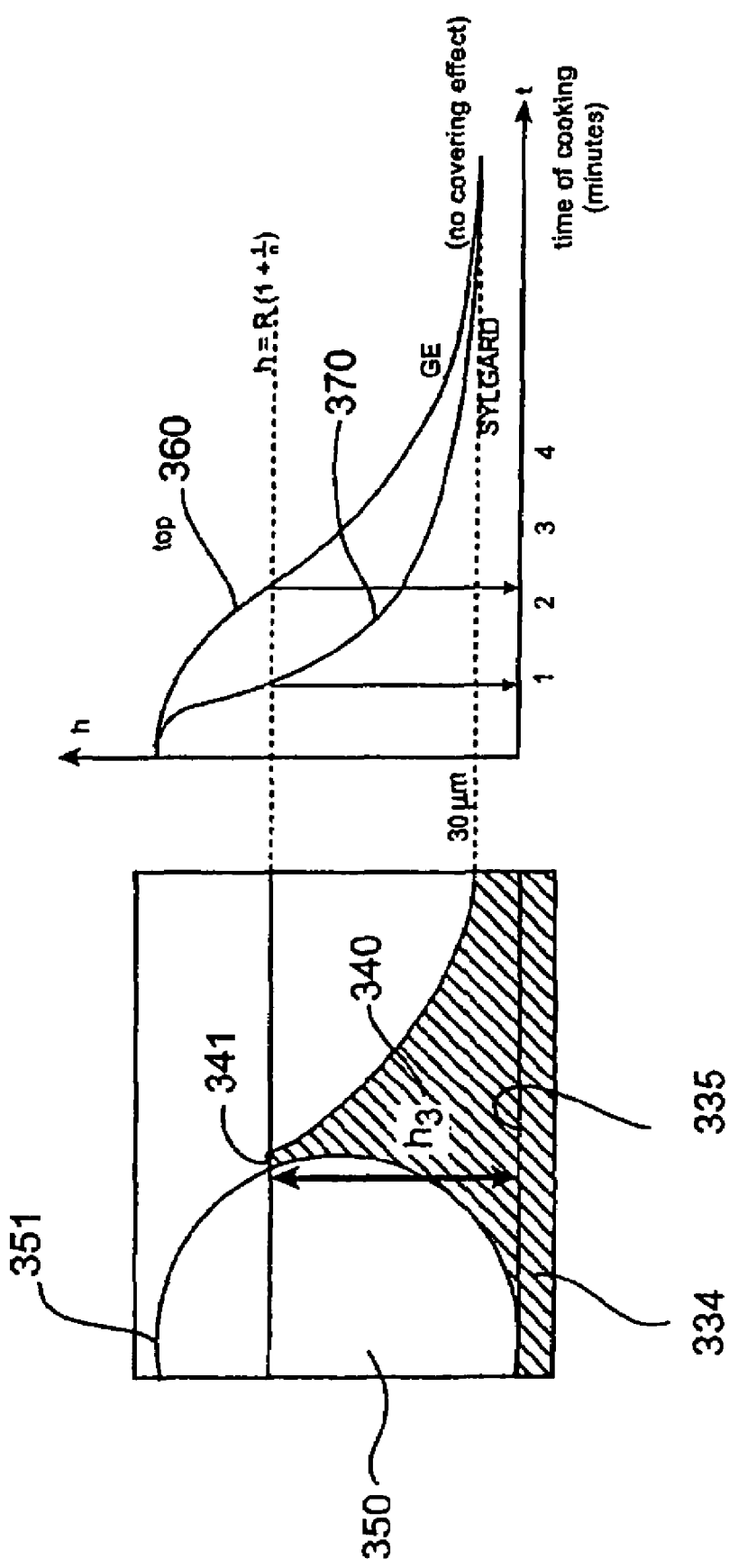
FIG. 12A shows an enlarged cross-sectional view of a section of FIG. 11 illustrating the height of a layer of material around a mold core.
FIG. 12B shows a calibration curve graph for determining a pre-curing graph for determining a pre-curing time period based upon the selected height of the material.

FIG. 12A illustrates a preferred height $h_3$ of the second layer 340 relative to the spherical mold core 350 at the conclusion of the pre-curing process. Because the second layer 340 is used to form the mold, as will be described hereinafter, it is desirable that a portion of the second layer 340 encapsulates the spherical mold core 350. Preferably, the second layer 340 is formed to a height $h_3$ around the spherical mold core 350. One preferred height $h_3$ is determined according to the following relation (II):

$$h=r(1+1/n_s)$$

where r is the radius of the spherical mold core 350, $n_s$ is the index of refraction of the material which forms the lens.

The period of time that the material of the second layer 340 should be heated is dependent upon several parameters, including the type of material that is being used to form the second layer 340. Calibration curves can be empirically generated for different types of materials and one exemplary calibration curve graph is illustrated in FIG. 12B. FIG. 12A also illustrates the height $h_3$ of the second layer 340 relative to the spherical mold core 350 so that the relationship between the calibration curves and the height h is more readily illustrated. This exemplary calibration curve graph is based on the second layer 340 having a thickness of 30 microns. The graph includes a first calibration curve 360 and a second calibration curve 370. The first calibration curve 360 represents the instance where General Electric RTV 615 is used as the material of the second layer 340 and the second calibration curve 370 represents when Sylgard® silicon is used (commercially available from Dow Corning).

The calibration curves 360, 370 can be used to define the proper period of time that a given material is to be subjected to the pre-curing process described above. The pre-curing process is done prior to positioning of the spherical mold core 350 into the heated material 340. As previously-described, it is desirable for the height $h_3$ of the material to calculated according to the relation (II). In the calibration curve graph, the y axis represents the height $h_3$ of the material and the x axis represents the period of time that the material is heated. The initial thickness of the material is predetermined so that the material will encapsulate a substantial portion of the surface of the spherical mold core 350 if the material does not undergo the aforementioned pre-curing process. From this starting point, the time period for the pre-curing process is calculated so that the covering effect on the mold core 350 is reduced to a preselected value (i.e., until a desired $h_3$). As the material is heated in the pre-curing process, less and less of the surface of the mold core 350 is covered with the material. As the time period (t) approaches infinity, the curves will approach the starting thickness of the material (30 microns in this exemplary embodiment). In other words, as t approaches infinity, the covering effect is essentially eliminated.

Using the applicable calibration curve based upon the precise parameters of the application, the user can easily determine the value of t given the desired characteristics of the molding, including the height $h_3$ of the material 340. In one exemplary embodiment, the value of t is determined based upon the height $h_3$ being determined according to the relation (II), namely $h=r(1+1/n_s)$. In the exemplary embodiment illustrated by the calibration curve graph of FIG. 12, the value of t for General Electric RTV 615 is about 2 minutes and 15 seconds and the value of t for Slygard® is slightly less than 1 minute.

It will be understood that the calibration curve graph illustrated in FIG. 12B is specific for a second layer 340 having a thickness of 30 microns with the material of the second layer 340 either being Sylgard® or General Electric RTV 615. Therefore, other calibration curves can be used if the thickness of the second layer 340 and/or the material itself are changed. One of skill in the art will appreciate that a number of calibration curve graphs, can be empirically generated based upon the controlling parameters, such as the initial height h of the material prior to insertion of the spherical mold core 350, the radius of the spherical mold core 350, the type of silicon material used, etc.

Once the desired height $h_3$ of the second layer 340 has been determined, the material forming the second layer 340 is heated for the time period (t) which is determined by the intersection between (a) a line parallel to the y axis that contains the height $h_3$ and (b) the respective calibration curve. By pre-curing the material for time period (t), which corresponds to height $h_3$ satisfying relation (II), the surface tension phenomena is controlled. This results in control of the amount of the spherical mold core 350 that is covered with the material upon positioning of the spherical mold core 330 in the second layer 340. This permits proper tailoring of height $h_3$ of the material 340 relative to the spherical mold core 350 and more particularly, because the material 340 is used to form the mold, this pre-curing process permits the mold dimensions to be controlled with enhanced precision. Advantageously, this allows lenses of very precise dimensions (micro size) and profiles to be produced.

Referring to FIGS. 11 and 12, after heating the second layer 340 for the selected time period (t), the spherical mold core 350 is positioned in the central region of the second layer 340 which is formed over the first layer 334 and the substrate 330. Because the first layer 334 is set, the spherical mold core 350 rests upon an upper surface 335 thereof. The second layer 340 defines an upper surface 341 at height $h_3$ such that an upper portion 351 of the spherical mold core 330 protrudes through an orifice 337 of diameter d from the upper surface 341 and creates highly undercut margins 308 around the orifice 337. As mentioned hereinbefore, the height $h_3$ of the second layer 340 is constrained by the relation (I) and, accordingly, the geometric details of the mold depend upon the thickness of the second layer 340 relative to the radius of the spherical mold core 350.

In order for the mold to be reusable where the structure has such undercut margins 308, the second layer 340 is formed of a pliant material and therefore the aforementioned silicon elastomers are suitable materials. In one exemplary embodiment, an RTV elastomer is made by mixing polymers, cross linkers and a catalyst. While this material cures at room temperature, it is typically set for a specified time period (e.g., 45 minutes to 2 hours) at an elevated temperature of 80° C. One preferred RTV elastomer comprises a first part of a polydimethylsiloxane bearing vinyl groups and a platinum catalyst and a second part of a cross linker containing silicon hydride (Si—H) groups. Once mixed, the silicon hydride groups form a covalent bond with the vinyl groups.

Figure 13:
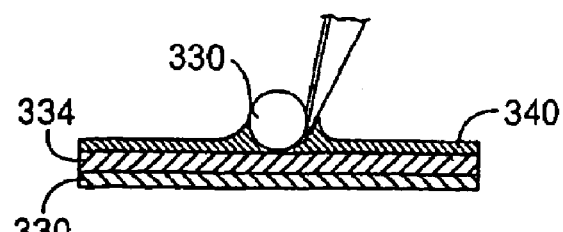
FIGS. 13-16 show cross-sectional views of further steps for producing the solid immersion lens structure after performing the step of FIG. 11.
Figure 14:
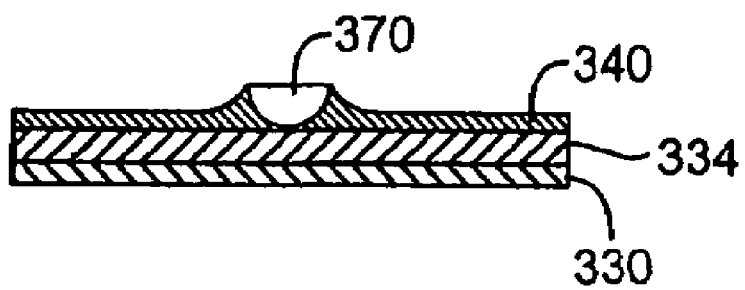

Referring to FIG. 13, once the second layer 340 has set, the spherical mold core 350 is removed so as to define a lens cavity 370 (FIG. 14). In this manner, a mold for producing a solid immersion lens structure is produced. To minimize the chance of bonding between the mold and the lens, the surface is treated with an oxygen plasma to form an anti-adhesive layer. Oxygen plasma effectively quenches the reactive functions of the silicon second layer 340 and prevent this layer from sticking to the lens. This permits the lens to be easily removed from the lens cavity 370 (FIG. 14). It will be appreciated that other methods of quenching the reactive functions of the silicon can be used so long as they are suitable for the intended use.

Figure 15:
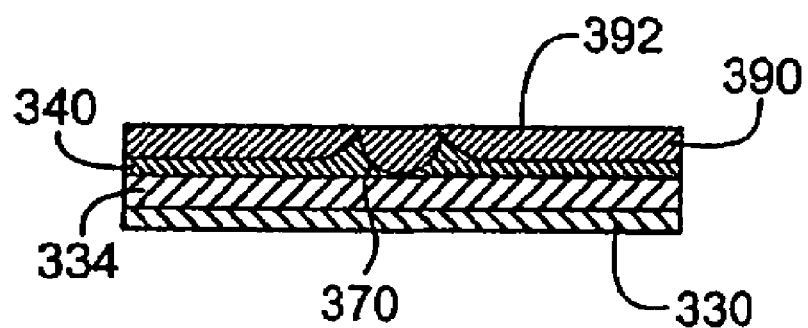

Referring to FIG. 15 and FIG. 7, the solid immersion lens structure 300 is produced by casting a moldable material into the lens cavity 370. The moldable material from which the solid immersion lens portion 302 of the solid immersion lens structure 300 is to be formed is typically cast onto the second layer 340 to fill not only the lens cavity 370, but also to form a third layer 390. In this step, the mold is typically placed in a container (not shown), such as a petri dish, to facilitate the formation of the third layer 390. The third layer 390 defines an upper surface 392 above the lens cavity 370. The third layer 390 forms the body portion 306 of the solid immersion lens structure 300 when the moldable material of the third layer 390 has set. In this manner, the body portion 306 of the solid immersion lens structure is integrally molded with the solid immersion lens portion 302.

Figure 16:
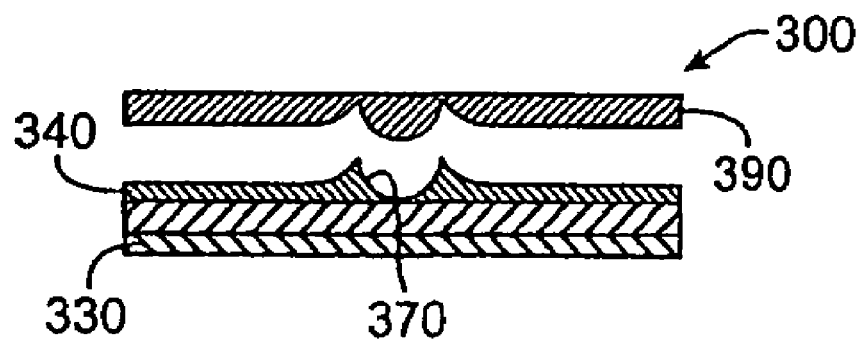

When the third layer 390 has set, the solid immersion lens structure 300, including the body portion 306 and the solid immersion lens portion 302, is formed. The solid immersion lens structure 300 is then removed from the mold as shown in FIG. 16. The material from which the SIL structure 300 is made in the mold may be of any suitable optically clear material that can be cast as a liquid at a temperature less than the temperature at which the mold is damaged or otherwise undesirably deformed. The SIL structure 300 may cure to a generally rigid solid or pliant solid. As with the SIL structure 50 of the first embodiment, the SIL structure 300 of the second embodiment is preferably formed of low temperature of formation polymers, including those listed previously herein with reference to the first embodiment. Accordingly, the lens material can be a pliant silicon elastomer, including General Electric RTV 615, the same material used to create the mold itself.

The moldable material from which the mold is made is deformable so that when the moldable material from which the solid immersion lens structure 300 is made, has set, and is removed from the mold, a region of the mold adjacent the mouth is permitted to deform thereby to permit the solid immersion lens to pass therethrough. Because the mold is formed of materials having the above characteristics, the mold is reusable and this results in significant cost savings being achieved.

Referring again to FIG. 7, the solid immersion lens structure 300 includes the observation region 310 in a passage that extends through the structure itself. This passage may be formed in any suitable manner, such as by positioning an elongate mold core in the third layer 390, with reference to FIG. 15, prior to the moldable material defining the third layer 390 having set. The passage is then formed using the same steps outlined previously in reference to the formation of passage 52 (FIG. 1). In another embodiment, the base portion 306 is actually formed of two sections. A first section is formed separately from the second section and includes the section of the base portion 306 that includes the observation region 310. An upper surface of this first section is located slightly above the observation region 310 with the second section of the base portion 306 including the lens portion 302 and an upper section of the base portion 306 (at least the upper surface 304 thereof). The two sections are formed of a pliant elastomer and then are integrally connected to one another using a suitable process, such as plasma bonding or off ratio combination. As previously-mentioned, one preferred RTV elastomer is actually formed of two parts which are mixed according to a predetermined ratio to form the RTV elastomer. For example, one exemplary RTV elastomer is mixed according to a 10:1 ratio (first part:second part) which yields a complete reaction in which all of the reagents are spent. In off ratio combination, the two elastomeric layers that are to be integrally bonded are mixed according to different ratios. For example, the first section of the base portion 306 may be mixed according to a 30:1 ratio, while the second section is mixed according to a 5:1 ratio. Both of these off ratio sections contain one reagent in excess so that when the two are place in contact with one another and cured, the two contacting interface surfaces of the sections bond due to excess reagents being present at these surfaces.

The following example illustrates one exemplary process for producing the SIL lens structure 300 according to one embodiment. It will be understood that this example is merely illustrative and not limiting of the present manufacturing process and/or SIL lens.

EXAMPLE 1

To create the mold of the SIL, a 150 microns radius micro sphere (Ruby ball lenses, Edmund industrial optics) is used.

The material from which the mold is to be formed (in this case silicon) is preferably prepared a maximum of 4 hours before use, complete manufacturing takes about this amount of time so the silicon is mixed immediately before beginning. To prepare 30 grams of 10:1 silicon, mix the two components (27 grams of GE RTV 615A and 3 grams of GE RTV 615B) and use an Eyence Hybrid Mixer (mix for 1 minute and defoam for 2 minutes). If some bubbles appear when pouring RTV, it's helpful to defoam again for 1 or 2 minutes.

A 1 mm substrate is used and is cleaned by putting it on a spin coater at 1000 RPM and flushing it with acetone for 1 minute. The size of the substrate is not especially critical, but the use of a plastic dish should be avoided because it's not flat enough.

To make a first layer of RTV, pour fresh RTV on the substrate locked by a vacuum. Completely cover the substrate and remove the bubbles with a wood tongue depressor. Then, launch the spin coater at 700 RPM for 1 minute, with two ramps of 15 seconds. After spinning, place the cover slip in a covered petri dish and bake for 3 minutes at 80° C.

The substrate is then taken out of the oven and is cooled for 2 minutes, then put back into the spin coater. Pour a new amount of uncured RTV, then spin at 700 RPM for 1 minute, with two ramp of 15 seconds: this will create a 30 microns thick layer which is used to calibrate the covering effect. It's the minimum thickness to completely cover a mold core (radius 150 microns) with uncured RTV/Sylgard®.

The calibration curve of FIG. 12B is then used to determine the time period for the pre-curing process based upon the desired height of the layer.

After these two minutes, work as quickly as possible: handle one mold core (ruby ball of radius=150 microns), previously cleaned with isopropanol and treated with TMCS for one minute and release it in the middle of the substrate. The tweezers should not touch uncured RTV, even if the ball sticks to the tweezers, otherwise the cover effect will be deeply modified and no longer symmetric. It may be advantageous to use two dry tweezers washed with acetone (put them in the oven for a few minutes). Place the substrate back in the oven and then heat for 45 minutes.

Take the substrate out of the oven and let it cool down for 2 minutes, then operate under a microscope (30× is recommended). The use of very sharp tweezers is not a preferred tool, as it will scratch the surface of the mold. Flat tweezers are better tools because they do not damage the mold. The mold core is removed using this tool.

Clean the mold of any dust and remnants of silicon with isopropanol and then acetone, and the mold is then placed in the oven for a few minutes, then transfer the mold on the substrate into the plasma treatment machine. Burn in oxygen plasma for 2 minutes.

The substrate is then placed in a petri dish, at 1 cm from the bottom of the dish using a wood tongue depressor, and an excess of silicon is poured in. The bottom of the substrate should be free from any silicon. It's very difficult to fill the hole with silicon without using vacuum, so the petri dish has to be placed in the degassing machine for an average of 20 minutes. All the bubbles should disappear from the surface of the mold. The substrate is placed into the spin coater and spun at 700 RPM for 1 minute, with two ramps of 15 seconds: this will create a flat surface, with the right thickness for the lens. The substrate is then placed in a new petri dish and cooked for 45 minutes at 80° C.

The new layer is carefully peeled from the mold. For example, a scalpel can be used to cut all around the cover slip from the top to the substrate, and the silicon borders are removed from the substrate. Make a light scratch in the new layer, far from the lens, and try to insert flat tweezers into that scratch: they will lift the new layer. Then lift this layer on both sides of the cover slip, and stretch it around the lens; the round surface will leave the hole and stay with the layer, which makes it easier to handle and then to use. In this manner, an exemplary SIL lens structure 300 may be made.

Figure 17:
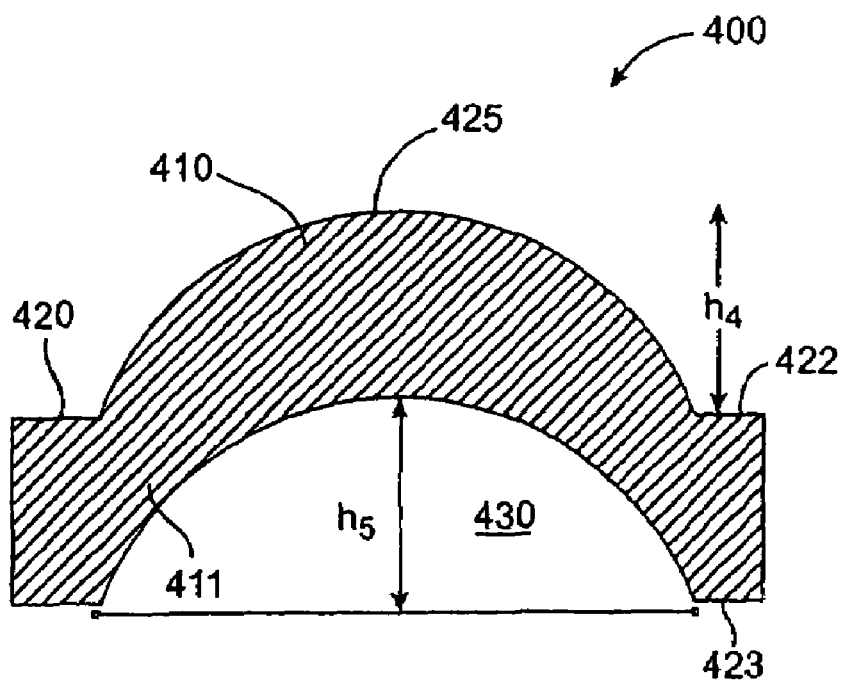
FIG. 17 shows a schematic cross-sectional view of a solid immersion lens structure of a meniscus type.

In yet another embodiment, a lens of a different type is illustrated in FIG. 17 and generally indicated at 400. The lens 400 is of a type that is often referred to as being of a meniscus type as it includes a convex surface on one side and a concave surface on the opposite side. The lens 400 has some properties that are similar to those properties of the SIL structure 300, i.e., hemispherical shape and improved efficiency in light collection and focusing, and the lens 400 finds particular use as a complementary lens to be used with the SIL structure 300. The lens 400 includes a lens portion 410 having an index of refraction m and an integral body portion 420. The lens portion 410 is disposed at a highest height $h_4$ above an upper surface 422 of the body portion 420.

The lens portion 410 of the lens 400 has a first surface 425 of convex shape and an opposing second surface 411 which has a concave shape. The lens 400 also has a cavity 430 formed in the body portion 420. The cavity 430 is formed below the lens portion 410 and is aligned therewith. The cavity 430 has a depth $h_5$ as measured from a second surface 423 of the body portion 420. Depending upon the application, $h_5$ may be from about 10 microns to about 1 cm and in one exemplary embodiment is about 290 microns. The value of the depth $h_5$ is a function of the radius of curvature of the lens received therein and the radius of curvature of surface 411 and the position of the sample. Preferably, the vertical displacement between the surfaces 411 and 425 is given by the radius of curvature of the surface 411 divided by the index of refraction. In the illustrated embodiment, the cavity 430 is arcuate in shape and generally approaches the shape of a hemisphere.

The meniscus type lens 400 is designed to capture a very large solid angle of illumination (e.g., from about 4.4 steradians to 6.3 steradians) and acts to further and more completely redirect light to a detection element (not shown). More specifically, the first and second lens surfaces 425, 411 of the meniscus type lens 400 are carefully designed to provide the aforementioned benefits. The second surface 411 is configured so that light from the sample that traverses this lens surface does not bend (the light is undeviated). The light travels through the lens portion 410 and the first surface 425 is configured so that the light rays become more deviated as they traverse this lens surface and enter the medium adjacent the lens portion 410. The deviation is such that the light rays are bent (redirected) to have a more vertical, collimated orientation. Such bending of the light causes the light to be redirected toward the detection element and results in enhancement of the numerical aperture (NA).

The meniscus type lens 400 is particularly tailored to be used in combination with the SIL structure 300 (which acts as an efficient collector and focuser). In one exemplary embodiment where the SIL structure is used in combination with the lens 400, the meniscus type lens 400 is designed such that the center of the second surface 411 marks the location of a virtual image of the sample that is created by lens portion 302 (FIG. 7). Furthermore, the distance from the top of the first surface 425 to the virtual image created by the lens portion 302 preferably is determined by relation (II). For example and according to one exemplary embodiment, this distance is about 280 microns but may extend from 10 microns to 1 cm depending upon the precise application. Thus, the lens portion 410 has a shape that approaches a hemisphere to a much greater degree than is ordinarily obtainable using conventional fabrication methods and this provides the aforementioned advantages.

Figure 18:
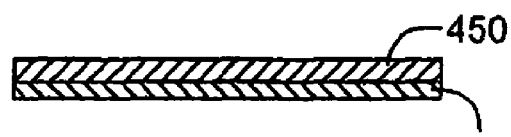
FIG. 18 shows a cross-sectional view of an initial step in a method for producing a lens of the type shown in FIG. 17.

A method for producing the lens structure 400 is described with reference to FIGS. 18 through 28A. Referring to FIG. 18, a container 440, typically in the form of a shallow dish defining a base wall and four peripheral upstanding sidewalls provides the housing for a mold. To produce the meniscus type lens 400, a mold is formed. To form the mold, a first layer 450 of moldable material from which the mold is to be formed is cast into the container 440. Preferably, the first layer 450 is cast to have a uniform thickness by using conventional techniques, such as spin coating.

Figure 19:
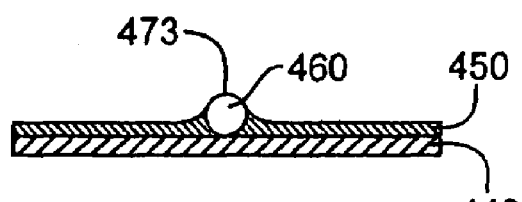
FIGS. 19-21 show cross-sectional views illustrating further steps for producing the meniscus type lens after the step of FIG. 18 is performed.

After casting the first layer 450, a mold core 460 is positioned in the container 440 on the first layer 450 as shown in FIG. 19. In this embodiment, there is no need for the first layer 450 to be set prior to the mold core 460 being disposed thereon. In fact, it is permissable that the mold core 460 seats against the container 440 because the top portion 462 of the mold core is the portion that is used to form the mold. The first layer 450 is then set and to minimize the chance of bonding between the mold and the lens, the first layer 450 is treated with an oxygen plasma to form an anti-adhesive layer (not shown).

As with the other embodiments, the mold core 460 is a spherical bead of uniformly smooth surface and is available in a number of dimensions, including micro sizes. For example, in one embodiment, the mold core 460 can have a radius from about 150 microns to about 4.5 mm; however, it will be understood that the radius is selected in view of the dimensions of the lens which is to be fabricated and the radius may be less than 150 microns or greater than 4.5 mm in some applications.

Figure 20:
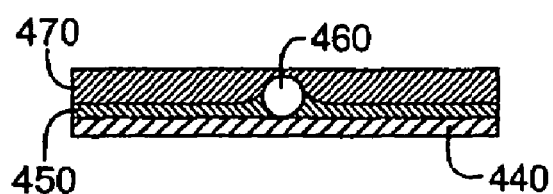

Referring now to FIG. 20, a second layer 470 of moldable material is cast into the container 440. The thickness of the second layer 470 is not critical so long as the second layer 470 is of sufficient thickness so that the second layer 470 has a rigid form. In one exemplary embodiment, the second layer 470 has a thickness of about 5 mm or greater. The second layer 470 is then set.

Figure 21:
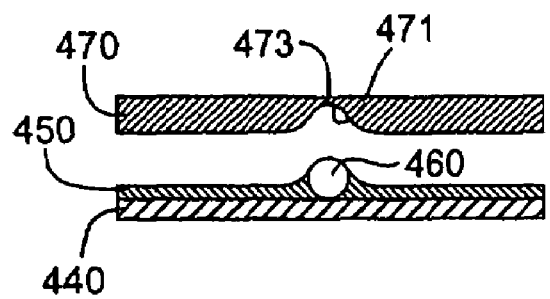

Referring to FIG. 21, once the second layer 470 is set, the second layer 470 is removed from the first layer 450 and the mold core 460. A cavity 471 is formed in the second layer 450 due to the mold core 460 protruding into this second layer 450 prior to it setting. The oxygen plasma treatment facilitates the easy removal of the second layer 470. Preferably, two or more locating holes (not shown) are formed through the complete structure (i.e., the overlying first and second layers 450, 470) before the removal of the second layer 470. These locating holes are formed in locations remote from the mold core 460. The locating holes receive locating pins (e.g., stub adapters) for ensuring proper registration of the layers. Other alignment means can be used, such as visual markers that are embedded in one or more of the molds. After separating the second layer 470 from the rest of the structure, a bottom surface of the second layer 470 is treated with an oxygen plasma to form an anti-adhesive layer (not shown).

Figure 22A:
FIGS. 22A-22C show sequential steps for producing a spacer layer used in the method for producing the meniscus type lens shown in FIG. 17.
Figure 22B:
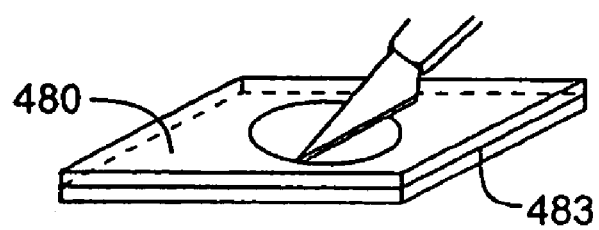
Figure 22C:
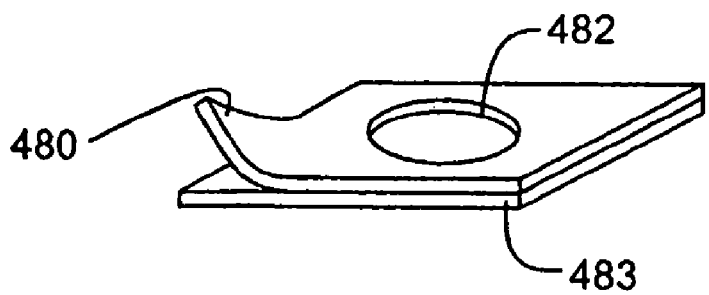
Figure 29:
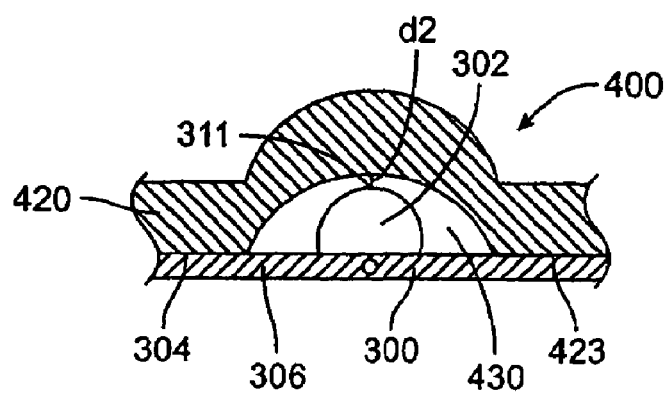
FIG. 29 shows a cross-sectional view of a lens system including the solid immersion lens structure of FIG. 7 in combination with the meniscus type lens of FIG. 17.

With reference to FIG. 21 and FIG. 22C, one of the parameters of the molding method which is precisely controlled is the distance between the two parts of the mold. The spacing is such that a point 473 of the cavity 470 lies a predetermined distance from the object under examination. In one embodiment, the point 473 is placed a first distance from the virtual image that is created by the SIL structure 300 when it is combined with the lens 400 as shown in FIG. 29. This first distance is equal to $r(1+1/n_s)$ from, where r is the radius of the spherical mold core 460 and $n_s$ is the index of refraction. This is the relation (II) previously set forth.

The first part of the mold is the second layer 470 and the second part of the mold is the first layer 450. One method of precisely distancing the two mold parts from one another is to form a third layer 480 of known thickness separate from the other layers. The thickness of this third layer 480 is precisely controlled and then an opening 482 of sufficient dimension is formed in the third layer 480. One method of forming the third layer 480 is illustrated in FIGS. 22A through 22C in which in step (A) a moldable material is cast into a container 483 that has been treated with oxygen plasma to a predetermined thickness to form the third layer 480; (B) the opening 482 is formed in the third layer 480; and (C) the third layer 480 is removed from the container 483 and treated with oxygen plasma.

Figure 23:
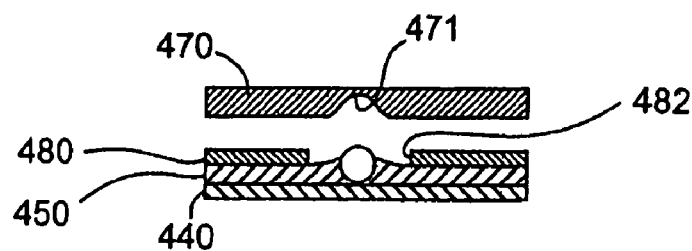

Referring to FIG. 23, the third layer 480 is then disposed on the first layer 450 such that the mold core 460 is located within the opening 482. The opening 482 is dimensioned so that not only the mold core 460 but also a section of the first layer 450 surrounding the mold core 460 is exposed through the opening 482. The second layer 470 is then cast on top of the third layer 480 and locating holes are formed in the third layer 480 such that the locating holes of all three layers are aligned. Locating pins are then preferably reinserted into the locating holes. After placement of the third layer 480 on the first layer 450, the second part of the mold is now defined by the combined first and third layers 450, 480. In this manner, a mold for producing the meniscus type lens 400 is produced.

The first, second and third layers 450, 470, 480 may be formed of the aforementioned materials that are suitable for forming the molds of the previously described embodiments, e.g., silicon polymers, such as Sylgard® or General Electric RTV 615.

Figure 24:
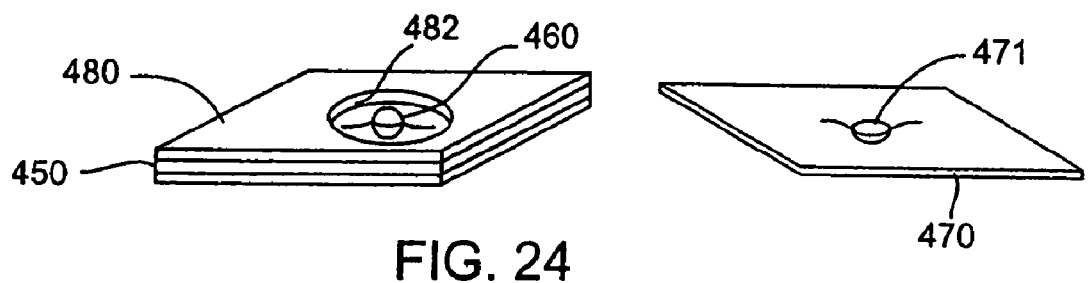

Referring to FIG. 24 and FIG. 17, the meniscus type lens 400 is produced by first separating the first part of the mold (second layer 470) from the second part of the mold (first and third layers 450, 480). A moldable material from which the lens portion 410 of the meniscus type lens 400 is to be formed is typically cast onto the second layer 470 such that the moldable material fills not only the cavity 471 but also an area surrounding the cavity 471. The moldable material is also cast onto the first and third layers 450, 480 such that the moldable material fills the opening 482 of the third layer 480. This moldable material forms an intermediate layer between the two mold parts.

Figure 25:
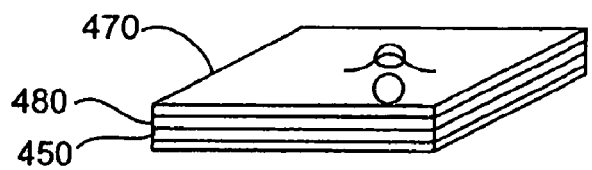

Referring to FIG. 25, the first and second mold parts are then seated against one another and the locating pins are placed into the locating holes to ensure proper registration between the first and second mold parts. The complete assembled mold is then heated for a predetermined period of time to ensure that the moldable material forming the meniscus type lens 400 has properly set. After the predetermined period of time has passed, the assembled mold is removed from the heating apparatus and allowed to cool. The first mold part (second layer 470) is then carefully removed from the second mold part (first and third layers

Figure 26:
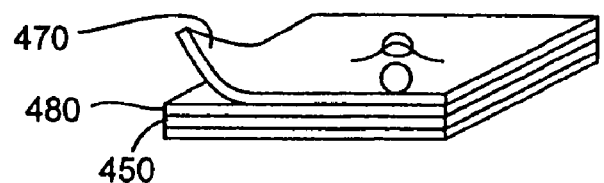

450, 480), as shown in FIG. 26. The first mold part should be carefully stored as it is reusable.

Figure 27:
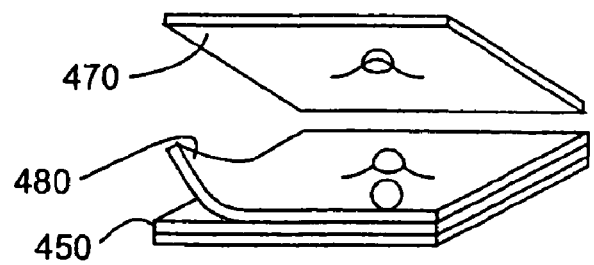
Figure 28A:
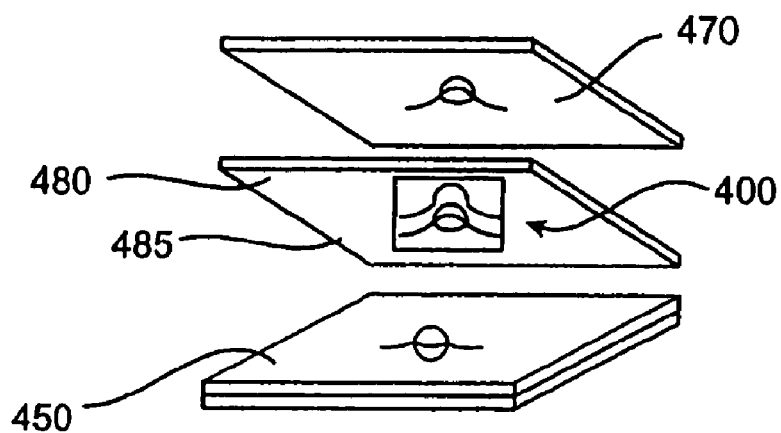
Figure 28B:
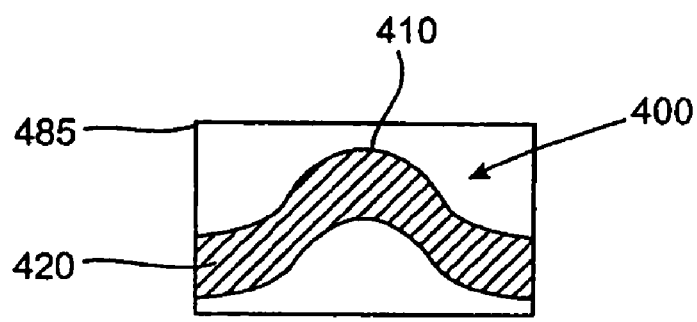
FIG. 28B shows an enlarged cross-sectional view of a section of FIG. 22A from which the meniscus type lens of FIG. 17 is formed.

Next, the third layer 480, including the intermediate layer forming the lens 400, is removed from the first layer 450 of the mold as shown in FIG. 27 and FIG. 28A. Referring to FIG. 28A, the intermediate layer, generally indicated at 485 and which forms the meniscus type lens 400, is then removed from the third layer 480, thereby leaving the third layer 480 to be reused. Once the meniscus type lens 400 is removed from the third layer 480, the mold looks identical to that shown in FIG. 23 prior to the casting of the moldable material which forms the meniscus type SIL. As shown in FIG. 28B, the intermediate layer 485 thus forms not only the body portion 420 but also the lens portion 410 of the meniscus type lens 400. In this manner, the body portion 410 is integrally molded together with the lens portion 410.

As with the other embodiments, the material from which the meniscus type lens 400 is made using the aforementioned mold may be of any suitable optically clear material that can be cast as a liquid at a temperature less than the temperature at which the mold is damaged or otherwise undesirably deformed. Preferably, the lens material is a pliant silicon elastomer and one exemplary material is the silicon elastomer used to form the mold parts (General Electric RTV 615).

Figure 28C:
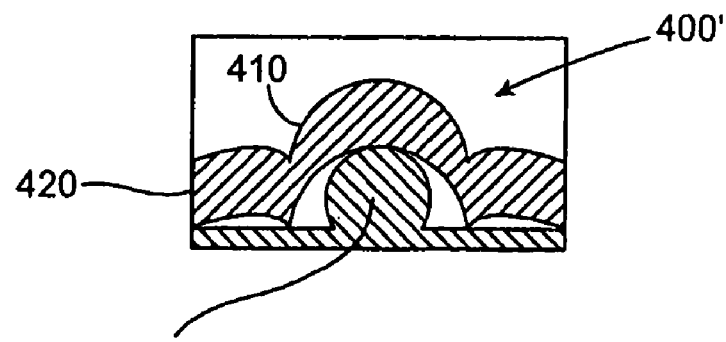
FIG. 28C shows a cross-sectional view of another embodiment of a meniscus type lens of the type shown in FIG. 17 used in combination with the solid immersion lens structure of FIG. 7.

It will be appreciated that the profile of the meniscus type lens 400 may be varied from the profile illustrated in FIG. 28C using several techniques during the molding method. Referring again to FIGS. 18, 19 and 28C, prior to subjecting the first layer 450 to the oxygen plasma treatment and casting the second layer 450 on the first layer 450, the upper surface of the first layer 450 around the mold core 460 can be profiled. For example, a cutting tool, such as a scalpel, is used to cut the material of the first layer 450 around the mold core 460 so as to alter the surface profile of the first layer 450 around the mold core 460. FIG. 28C illustrates one exemplary profile for an meniscus type lens 400' that is obtained by cutting the first layer 450 in select locations. By precisely cutting the first layer 450 around the mold core 460 (FIG. 19), the shape of the later formed lens is controlled with precision. FIG. 28C illustrates the meniscus type lens 400" used in combination with SIL structure 300.

The following example illustrates one exemplary process for producing the meniscus type lens 400 according to one embodiment. It will be understood that this example is merely illustrative and not limiting of the present manufacturing process and/or the lens 400.

EXAMPLE 2

To create one exemplary mold of the meniscus type lens 400, a 395-micron radius micro sphere ("bead") is used (Ruby ball lenses, Edmund industrial optics). This size is very close to the minimum size of about 360 microns needed to cover the SIL of Example 1.

In a large petri dish, the amount of silicon needed is poured; the thickness of the layer has to be exactly about 280 microns in order to achieve the correct height using this size bead. The silicon is poured in the center of the petri dish, and then spin the petri dish at 300 RPM until the silicon meets the borders of the petri dish.

The dish is placed in an oven for a few minutes (5-6 min) before putting in the bead. It's better to treat the bead with TMCS, and then to clean it with acetone before releasing it in the middle of the petri dish. The dish is then placed in the oven at 80° C. for 45 minutes.

There is no need for a layer of cured silicon under the bead, it can lie on the bottom of the petri dish because we just use the top of the bead. The silicon behaves as described before around the top of the bead, but since we use a large surface, the average thickness of the layer is 280 microns:

The petri dish is taken out of the oven, and is cooled for a few minutes. Then treat it with oxygen plasma for 2 minutes and pour some new silicon. The thickness of this new layer doesn't need to be perfectly known, it just has to be thick enough to be rigid; preferably the layer is at least about 5 mm thick. The use of the degassing machine is preferred to prevent micro-bubbles that can appear during curing. The dish is heated for at least 1 hour, then it is cooled.

Before peeling the new layer, in order to align the two parts of the mold, it's very useful to punch two holes into the complete device, far from the bead. (The use of Luer Stub Adapter makes this operation easier).

Silicon shrinks when it's cured, so take both layers out of the petri dish before peeling (the two parts will shrink together). Take the upper layer and treat it with oxygen plasma for 2 minutes.

One parameter to control exactly is the distance between the two parts of the mold; the most convenient way to achieve this is to make a layer with the right thickness, and then cut a hold. To obtain a 280-micron layer, pour the fresh silicon exactly in the center of the petri dish, and then spin at 300 RPM until the silicon joins the borders. Treat this layer with oxygen plasma for 2 minutes, then put it between the two parts, press and put back the Stub Adapter to punch holes in the right place.

On both sides of the mold, separately, pour an excess of fresh silicon. Use the degassing machine to take the bubbles out of the hole of the upper layer.

Put the two pieces together, press and put back the two Stub Adapter. Put a heavy piece of metal on top of the assembly and put in the oven for at least 1 hour and 30 minutes.

The petri dish is taken out of the oven, cooled and then the Stub Adapter are taken out of the assembly.

Peel carefully the upper layer and keep it clean, it's perfectly reusable.

Peel the middle layer then take the lens out of this layer so that the layer can be used again. In this manner the mold is formed.

The advantages of the present molding method are that lens portion 410 is much closer to a hemispherical shape than was otherwise ordinarily obtainable using conventional fabrication methods. This results in the lens 400 having improved light collection properties and also improved light focusing properties.

Referring to FIG. 7 and FIG. 17, the SIL structure 300 may be used in the same applications that were mentioned with respect to the SIL structure 50. For example, the SIL structure 300 may be used in conventional imaging systems, including miniature microscope applications and the SIL structure 300 may further be used in light collection systems, such as a cytometer or a highly efficient spectrometer. A further application for the SIL structure 300 is in the form of arrays of lenses to enhance fluorescence detection, associated with screening micro-arrays. These arrays can be used to improve collection efficiency for CCDs. Because the SIL structure 300 acts not only as an efficient collector of light but also as an efficient means for concentrating and focusing light, its potential applications are widespread.

The meniscus type lens 400 may be used by itself in a number of applications including all of the potential applications listed above with reference to the SIL structures 300 and 50. In addition, because the meniscus type lens 400 is not a "contact" lens due to the lens portion 410 not being in contact with a surface, the meniscus type lens 400 maintains magnification properties and also increases the numerical aperture (NA). However, the user is not compelled to place the lens in contact with the surface and therefore the lens portion 410 of the meniscus type lens 400 is easy to move relative to the surface. This characteristic can be very useful for: (1) CD burners and data storage in general because there is not evanescent-wave coupling between the lens and the media; and (2) surface inspection with high-resolution. Other potential uses for the meniscus type lens 400 by itself include those applications that take advantage of the fact the meniscus type lens 400 is a similar to an SIL structure having an empty space inside (the cavity formed in the body portion underneath the lens portion). This structure can be useful to reduce the angular spread of light beams emanating from lamps, LED, etc.

Referring to FIG. 29, in one exemplary application, the meniscus type lens 400 is combined with the SIL 300 in an imaging system, such as a miniature microscope. In this arrangement, the meniscus type lens 400 is positioned above the SIL 300 so that the lens portion 302 of the SIL 300 is positioned within the cavity 430 of the meniscus type lens 400 without an upper portion 311 of the lens portion 302 contacting any portion of the wall forming the cavity 430. The distance between upper portion 311 and the lower face of lens 400 is controlled by distance $d_2$. A preferred embodiment is that $d_2$ is greater than zero so the lenses are not in contact.

It will be appreciated that the lower surface 423 of the body portion 420 of the meniscus type lens 400 can be arranged so that it seats against the upper surface 304 of the body portion 306 of the SIL strucutre 300 as shown in FIG. 29. The two lens structures 300, 400 can be attached to one another using any number of conventional techniques so long as they are suitable. For example, the lower surface 423 may be bonded (e.g., plasma bonding or off ratio combination) to the upper surface 304. It will be understood that other techniques promoting a bond or the like between the two lens structures may be used. Because the lens structures 300, 400 are formed of a pliant elastomer material, they may be easily integrally attached to a housing of an imaging system, light detection system, etc.

It will be appreciated that there are a wide range of applications for a system using the SIL lens structure/meniscus type lens combination. For example, this combination demagnifies an incident spot of light by a factor of 4 due to its optical properties. This characteristic can be exploited to improve the performances of CD burners and/or data storage and have utility in photolithography applications. The lens combination also significantly improves the light collection available with simple optical elements in a very cost effective production process and at low material costs. For example, one application is arrays with collection optics that send light to infinity. The array can be screened with a simple optical apparatus that doesn't require a precise positioning along a vertical axis. The mobile head that reads the fluorescence for example can be lighter than conventional apparatuses.

Other potential applications using the SIL structure 300 combined with the meniscus type lens 400 include the following: (1) a cell sorter and other applications that need a fluorescence detection or even just light detection; (2) a microscope that is micro-sized so that it can be placed on the top of an optical fiber; in addition, an endoscope can be designed to include an integrated microscope; and in general the lenses can be arranged such that they allow detection and function as a microscope in places unreachable with conventional microscopes; (3) microspectrophotometer with integration of a grating/prism; (4) a system that measures the coefficient of diffusion in liquids with a high precision; furthermore, by using a technique called fluorescence recover after photobleaching, the exact size of particles diffusing in a liquid can be determined and perhaps the affinities between proteins can be calculated; (4) an efficient confocal microscope; (5) using evanescent waves (created by prism, through the objective or using a stretched optical fiber), single molecule detection may be possible; and (6) the combination of techniques such as fluorescence recovery spectroscopy and evanescent waves can lead to a very efficient inspection of liquid medias: molecules near surfaces, concentration and interaction with a surface carrying other molecules; moreover, a chip can be designed to screen the interactions and automate drug affinity characterization.

Figure 30:
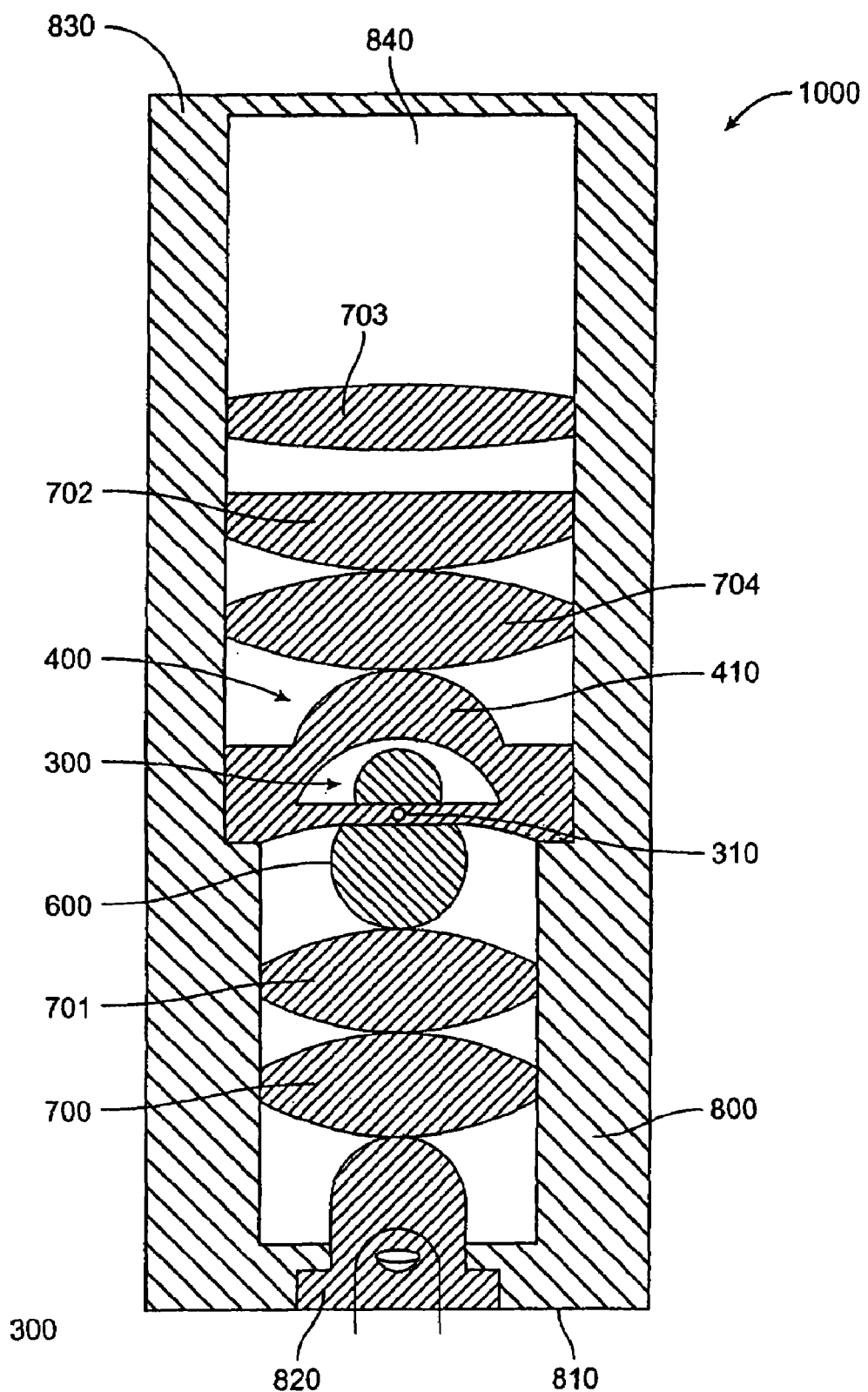
FIG. 30 shows a cross-sectional view of an integrated imaging system according to one embodiment.

Referring now to FIG. 30, an exemplary imaging system 1000 is shown. The exemplary imaging system 1000 is in the form of miniature microscope that has a housing 800 in which the plurality of lenses are located in a predetermined order and with predetermined spacing therebetween. Preferably, the lenses are integrally connected to the housing 800 so as to form a monolithic miniature microscope structure. According to one exemplary intended use, the miniature microscope 1000 is designed to have small dimensions, e.g., a length on the order of about 10 cm. At a first end 810 of the housing 800 is a light source 820, such as a laser or LED. The light source 820 emits light having a predetermined wavelength. At an opposite end 830, an image detector 840, such as a CCD camera, is provided for sensing a magnified, focused image that is produced as the light passes through the various lenses that are disposed between the light source 820 and the image detector 840.

The various types of lenses that are used in the miniature microscope 1000 are discussed in turn below.

The system includes the meniscus type lens 400 in combination with the SIL structure 300. The arrangement between the lens 400 and the SIL structure 300 is preferably the same as that described in detail with respect to FIG. 29. The miniature microscope also includes a lens 600 which is disposed below the SIL structure 300 and more particularly below the observation region 310. Lens 600 is aligned with respect to SIL lens structure 300 so that it focuses light onto a select area of the SIL lens structure 300. In one exemplary embodiment, the lens 600 is a solid immersion lens (SIL) 600 of the condenser. In other words, it is of an SIL structure and acts to focus light on the sample in the observation region 310. The lens 600 may be manufactured and positioned in the illustrated location using several different techniques. For example, the lens 600 can be manufactured using a method similar to the one described hereinbefore with reference to FIGS. 2 through 4. After forming the lens 600 using one of the disclosed molding methods, the lens 600 can then be integrally connected to the SIL structure 300 using a suitable technique, such as plasma bonding or off ratio combination. It will be appreciated that the dimensions of the lens 600 are greater than the dimensions of the SIL structure 300 due to the function of the lens 600 in the system 1000.

Figure 31:
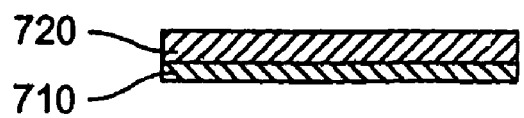
FIG. 31 shows a cross-sectional view of an initial step in a method for producing a lens structure of another type and for use in the integrated imaging system of FIG. 30.

The exemplary miniature microscope 1000 shown in FIG. 30 also includes a plurality of ordinary lenses which are generally indicated at 700, 701, 702, 703, 704. The precise number and shapes of the ordinary lenses will vary from application to application. The ordinary lenses may be produced using a molding method similar to the molding method used to produce the SIL structure 50 of FIG. 1 with the molds being specifically contoured and the process tailored to form a lens having particular dimensions and shape. The molding process of the present invention can be tailored to produce lenses that have different lenses surfaces. A method for producing an ordinary lens, such as the ordinary lenses 700-704, is described with reference to FIGS. 31 through 37. Referring to FIG. 31, a container 710, e.g., a shallow dish, provides the housing for the mold. To produce any one of the ordinary lenses 700, a respective mold is formed.

Figure 32:
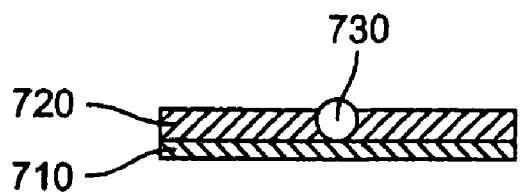
FIGS. 32-37 show cross-sectional views illustrating further steps for producing the lens structure after the step of FIG. 31 is performed.

To form the mold, a first layer 720 of moldable material (e.g., General Electric RTV 615) is cast into the container 710. The thickness of the first layer 720 is determined beforehand based upon a number of factors, including the radius of the lens 700. A mold core 730 (e.g., a ball bearing) is positioned within the first layer 720 as shown in FIG. 32. The dimensions of the mold core 730 in this embodiment are much greater than the dimensions of the mold cores used to form the micro-size SIL structures described hereinbefore. For example, the mold core 730 may have a radius as large as 1 cm. Because the mold core 730 is typically not micro-size, the covering effect of the material on the mold core 730 due to surface tension is not as critical in this embodiment because of the increased dimensions of the mold core 730. The first layer 720 is then set.

Figure 33:
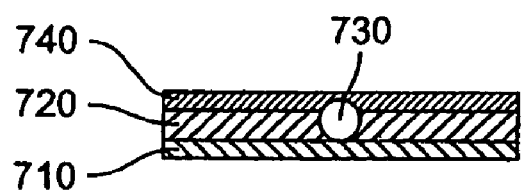

Referring to FIG. 33 once the first layer 720 is set, the mold core 730 is removed and the first layer 720 is treated with oxygen plasma. The mold core 730 is then inserted back into the cavity that it formed in the first layer 720. A second layer 740 is cast onto the first layer 720 including over the mold core 730. The thickness of the second layer 740 is preferably at least about 0.5 cm. The second layer 740 is then set.

Figure 34:
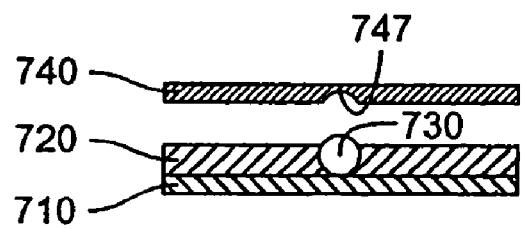

Once the second layer 740 has set, the second layer 740 is removed as shown in FIG. 34. The second layer 740 is a first part of the mold used to form the ordinary lens 700. The removed second layer 740 has a cavity 747 formed therein which results from the material of the second layer 740 flowing around the mold core 730. The formation of the rest of the mold depends upon what type of lens 700 is to be formed. More specifically, the method will differ depending upon whether the lens 700 is classified as a plano-convex lens or a convex lens.

To manufacture a plano-convex lens, only one spherical mold is needed. Therefore after treating the second layer 740 (the mold) with oxygen plasma, the mold is placed upside down in a container, such as container 710. A moldable material from which the lens is to be formed is cast onto the upwards facing surface (the surface having the cavity 747) of the second layer 740. The moldable material is a suitable optically clear material, such as those mentioned hereinbefore. The moldable material leaves the upwards facing surface of the mold and collect in the bottom of the container and the upper surface will be almost flat. At the same time, the moldable material is maintained in the cavity 747 as this material serves to form the lens. To improve its flatness it is possible to spin the container slowly being careful not to take too much of the moldable material out of the cavity formed in the second layer 740. The moldable material is then set and then subsequently removed from the mold (second layer 740).

Figure 35:
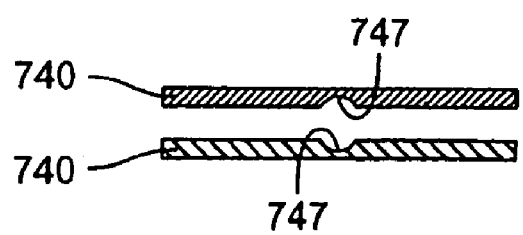

For convex lenses, two separate identical molds are needed. Thus, after forming the first mold (second layer 740) by casting this layer onto the first layer 720, setting and then removing the second layer 740, the method is repeated to form the second mold. In other words, additional moldable material forming the second layer 740 is cast onto the first layer 720, set and then removed to form the second mold. It has been discovered that it is more advantageous that the two molds are formed using the same part (i.e., the same first layer 720 and same mold core 730, to ensure that the two molds have essentially identical dimensions and profiles. FIG. 35 illustrates the two molds 740 spaced from one another in facing arrangement. The two molds 740 are each treated with oxygen plasma.

Figure 36:
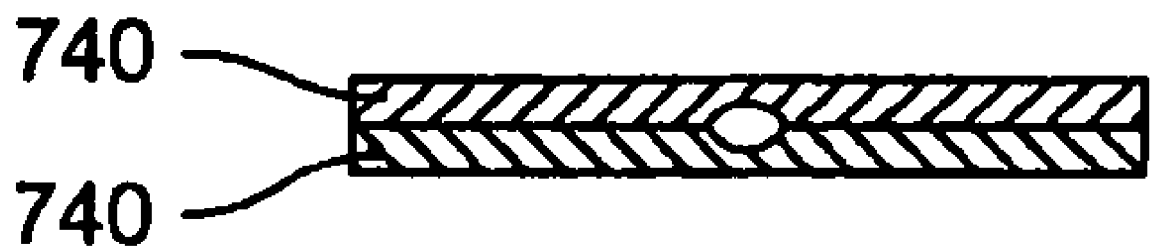

The two molds 740 should then be aligned with respect to one another using a high degree of precision. For example, the two molds 740 may be aligned under a microscope. Locating holes (not shown) are preferably formed through both molds 740 when the two molds 740 are seated against one another. Both molds 740 are first placed upside down in a container (such as container 710 of FIG. 31). Moldable material from which the convex lens 700 is to be formed is cast onto the upwards facing surfaces of the two molds 740 such that the moldable material fills not only each cavity 747 but also flows on the surfaces surrounding each cavity 747. One of the molds 740 is then placed on top of the other mold 740 with the cavities 747 being aligned and facing one another as shown in FIG. 36. Furthermore, the locating holes of each mold 740 are aligned and locating tools, such as locating pins, are inserted into the locating holes so as to ensure proper alignment between the two molds 740. The moldable material that forms the lens 700 is then set. The time period for this setting process should ensure that the curing heat has sufficient time to get to the middle of the assembled mold and heat and set the moldable material.

Figure 37:
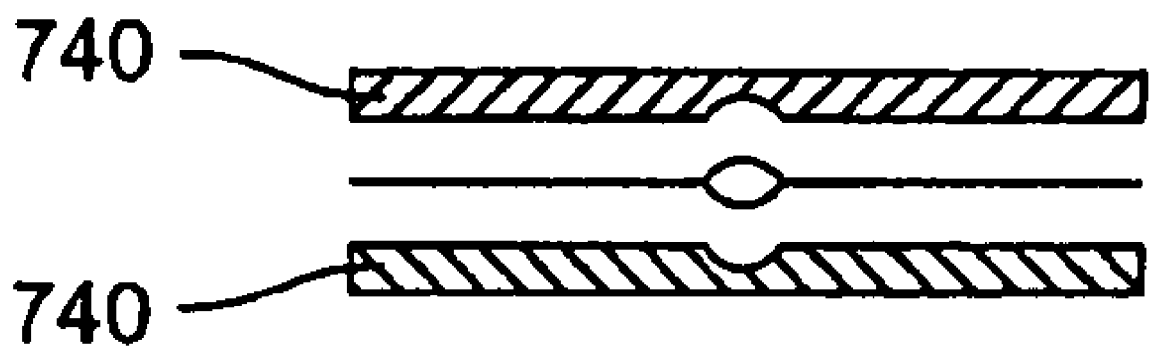

Referring to FIG. 37, the upper mold 740 is first removed and then the layer including the lens 700 is removed. This molding method results in the formation of lens 700 of convex design.

The molds 740 are reusable and additional lenses 700 having the same dimensions may be produced by simply repeating the steps illustrated in FIGS. 36 and 37. It will be appreciated that one complete mold produces one lens having a distinct shape and specific characteristics. Therefore, a number of molds may be formed according to the above method so as to provide molds designed to produce alternative shapes and sized for these lenses. The shapes, dimensions, and specific location of the ordinary lenses within the housing 800 will vary from application to application.

Figure 38:
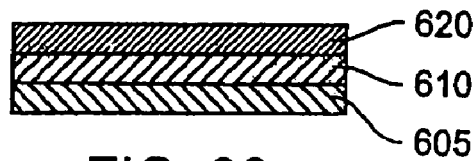
FIG. 38 shows a cross-sectional view of an initial step in an alternative method for producing a lens structure of yet another type and for use in the integrated imaging system of FIG. 30.
Figure 39:
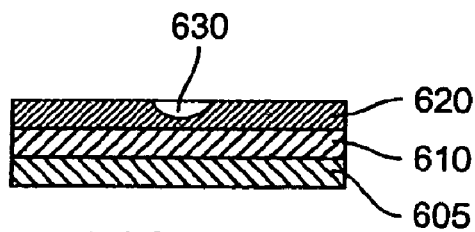
FIGS. 39-43 show cross-sectional views illustrating further steps for producing the lens structure after the step of FIG. 38 is performed.

It will be appreciated that the molding methods disclosed herein may be modified and tailored to produce lenses having any number of shapes and sizes. FIGS. 38 through 43 illustrate an alternative method for forming a lens having a predetermined shape and size. For purpose of illustration only, the method will be described with respect to the formation of a mold for producing a plano-convex lens. Referring to FIG. 38, a container 605, typically in the form of a shallow dish, provides a housing for the mold. To produce a plano-convex lens, such as lens 702, a buffer layer 610 is preferable cast onto the container 605. The buffer layer 605 is formed of any number of pliant materials, including pliant silicon elastomers. A first layer 620 of moldable material from which the mold is to be formed is cast into the container 605 on top of the layer 610. Preferably, the first layer 620 is cast to have a uniform thickness. After casting the first layer 620, a mold core 630 is positioned in the container 605 on the first layer 620 as shown in FIG. 39. The mold core 630 is actually a lens of predetermined shape and dimension and in this embodiment, the mold core 630 is a plano-convex glass lens because the mold is designed to produce a plano-convex lens formed of a pliant elastomer. The layer 610 should be of sufficient thickness so that it prevents the mold core 630 from contacting the container 605.

Figure 40:
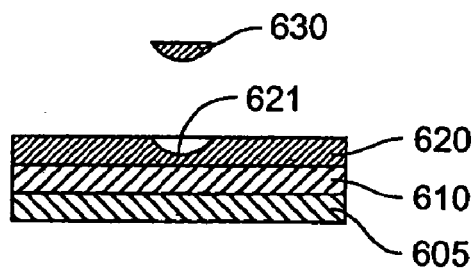

The initial thickness of the first layer 620 is selected in view of the dimensions of the mold core 630 so that the first layer 620 is formed to a height up to the point of the maximum dimension (e.g., diameter) of the mold core 630. In this instance and for the case of a mold core 630 in the form of a plano-convex lens, the convex surface faces the bottom of the container 605 and therefore, the first layer 620 is formed up to the plano portion of the mold core 630. The top surface of the first layer 620 thus defines a planar surface as shown in FIG. 39. The first layer 620 is allowed to set. Next as shown in FIG. 40, the lens mold core 630 is removed and the first layer 620 is treated with oxygen plasma. The lens mold core 630 defines a cavity 621 in the first layer 620. The formed first layer 620 comprises a first part of the mold.

Figure 41:
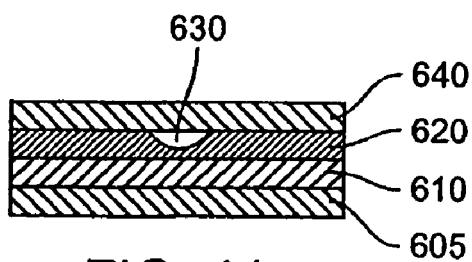
Figure 42:
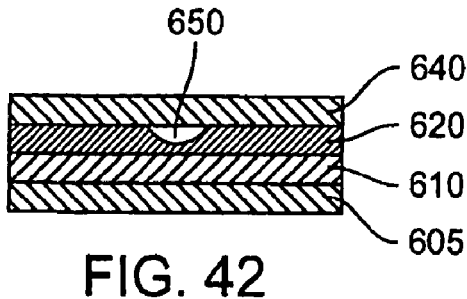
Figure 43:
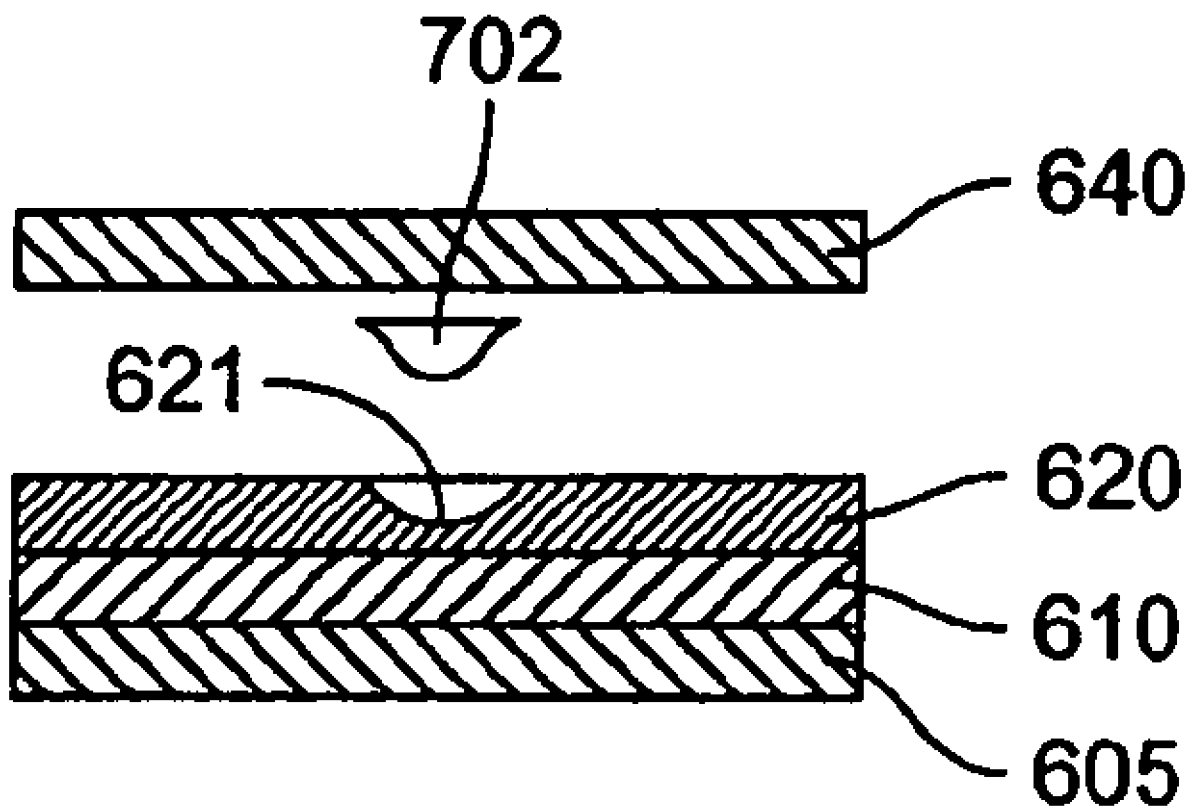

Referring to FIG. 41, the lens mold core 630 is repositioned in the cavity 621 and a second layer 640 of moldable material is cast onto the upper surface of the first layer 620 and the top surface of the lens mold core 630. The second layer 640 is cast to a predetermined thickness and then is allowed to set. Referring to FIG. 42, the second layer 640 comprises a second part of the mold and once the second layer 640 sets, the second layer 640 is removed and the lower surface thereof is treated with oxygen plasma. The lens mold core 630 is removed from the cavity 621 and then a moldable material 650 from which the lens 702 is formed is cast into the cavity 621 (first part of the mold) and then the second part of the mold (the second layer 640) is placed over the moldable material 650 that has been cast as a layer. The moldable material 650 is then set. Once, the moldable material 650 forming the lens sets, the second layer 640 is then removed and the lens 702 is removed from the cavity 621 as shown in FIG. 43.

It will be appreciated that the second part of the mold, namely the second layer 640, can be configured to have any number of shapes. In this embodiment, the second layer 640 has a planar lower surface; however, the lower surface can have other configurations, such as a convex or concave design. The above molding method is therefore readily adaptable to form a number of different types of lenses having a wide range of dimensions and shapes.

Exemplary materials used to form the first and second layers 620, 640 and include the silicone elastomers disclosed previously herein. The moldable material 650 from which the lens 702 is formed can be of the same type of material as the layers 620, 640 so long as it is a suitable optical material.

In the exemplary embodiment of FIG. 30, the lenses 700, 701, 600 are disposed between the light source 820 and the SIL structure 300, while the lenses 704, 702, 703 are disposed between the meniscus type lens 400 and the image detector 840. The first set of lenses 700, 701, 600 serves to focus the light to a spot in the sample chamber 310. For example, the lens 700 collects and collimates light from the LED 820, and the lens 701 refocuses the light onto the lens 704. The lens 600 is of the type that acts as a concentrator of light in that it collects and focuses the light to the sample chamber 310. In this exemplary embodiment, the lens 600 is of a solid immersion lens type; however, the lens 600 may be of any type so long as it has the aforementioned focusing characteristics. One advantage of having the lens 600 be an SIL lens structure formed using one of the methods disclosed herein is that its ability to collect and concentrate/focus the light from the LED 820 to the sample is improved compared to conventional lenses. When the lens 600 is of an SIL type lens, it can be made separately from the SIL structure 300 and then attached thereto by a suitable process, such as plasma bonding.

Figure 44:
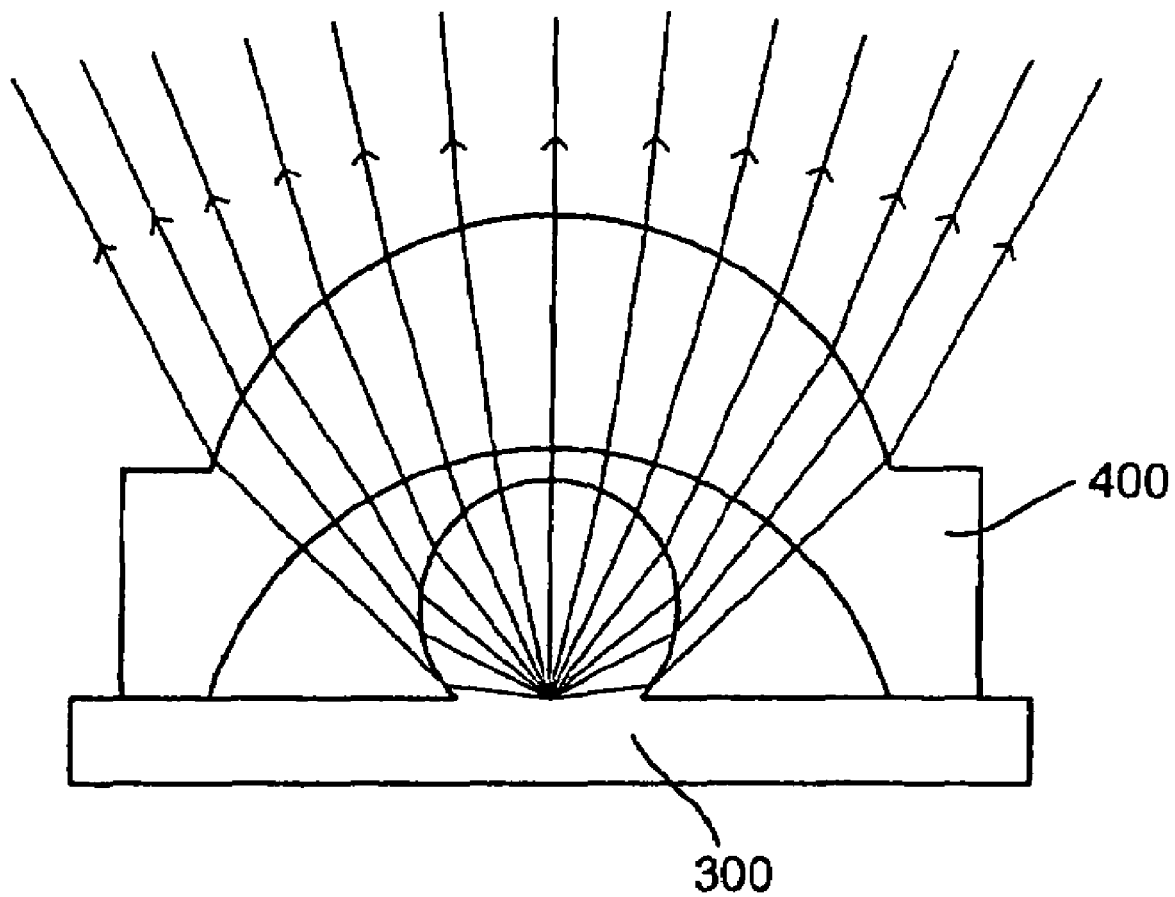
FIG. 44 shows a ray diagram for an SIL lens combined with a meniscus type lens.
Figure 45:
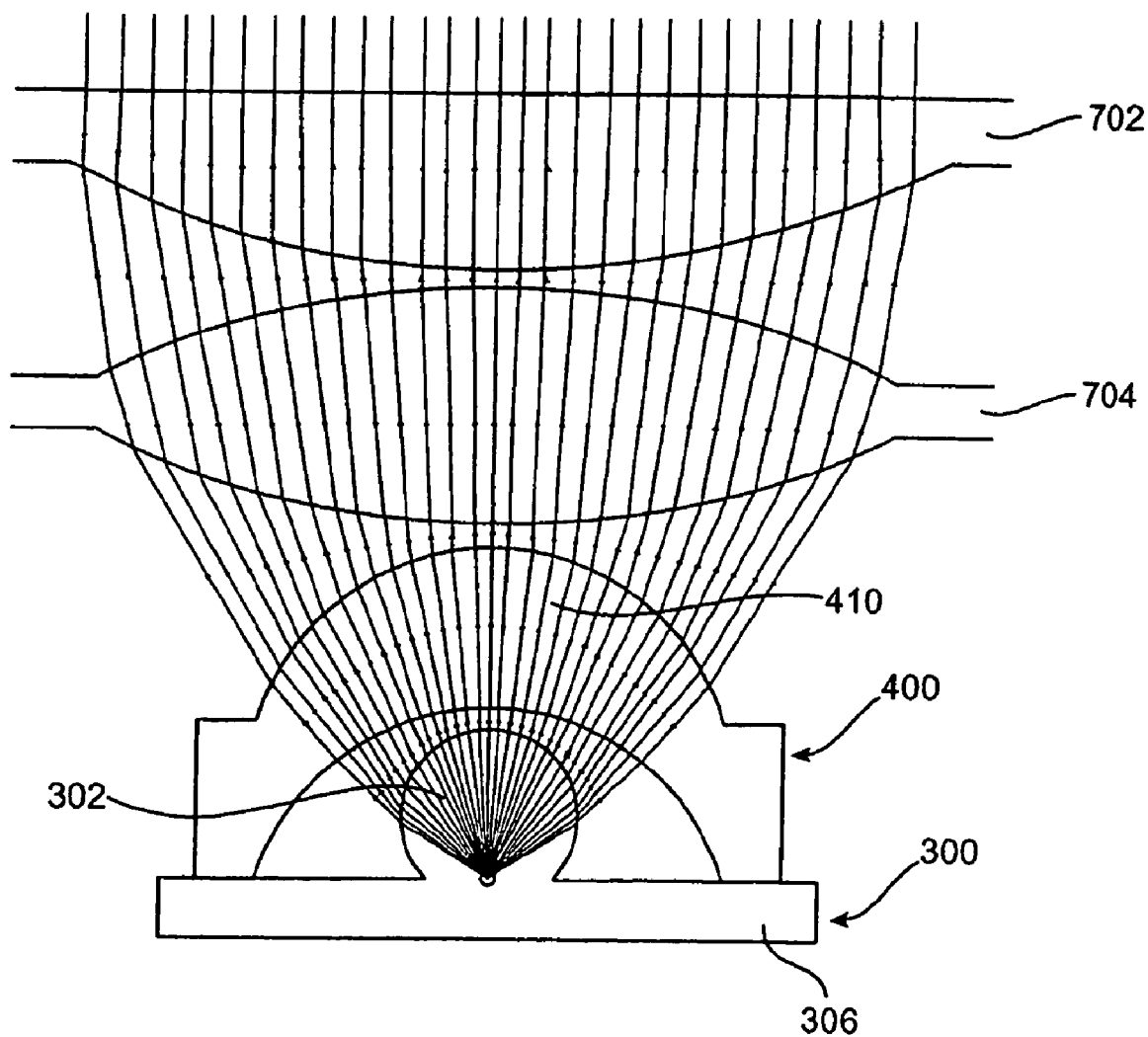
FIG. 45 shows a ray diagram for the combined lenses of FIG. 44 along with additional lenses positioned thereto.

In the lens arrangement of the miniature microscope 1000, the SIL structure 300 acts as an efficient collector of light that is emitted (reflected) from the illuminated sample. The meniscus type lens 400 enhances the light, as shown in FIG. 44, which is then directed to lenses 704 and 702. Furthermore, lens 400 acts to redirect and deviate the light towards the detector 840. Lenses 704 and 702 act to collimate the light as shown in the ray diagram of FIG. 45 and then lens 703 collects the collimated light and focuses the image as magnified onto an image sensor (e.g., a CCD array) of the detector 840. The relative positioning of the lens 703 and the image sensor determines the focus of the image. Other microscope configurations can be employed as suggested by this configuration.

One advantage of the molding methods described herein is that the molds can be formed with great precision in a range from micro-size to larger conventional lens sizes and are reusable, thereby permitting many lenses to be formed using a single mold. Conventional lenses are able to be easily and cost effectively manufactured using one of the disclosed molding methods. The manufacturing costs that can be saved using the present molding methods as compared to conventional lens making methods is significant. These savings permit the lenses to be produced inexpensively, while at the same time maintaining the precision and high quality of the lenses.

The lenses may be configured to have any number of different shapes, such as converging lenses (plano-convex and biconvex) or divulging lenses (Plano-concave or biconcave), etc. As one can appreciate lenses having conventional shapes are used in a variety of applications, including goggles, swimming pool glasses, other types of glasses, magnifiers, products have magnifying elements incorporated therein, etc. Because the lenses are preferably formed of a pliant silicon elastomer, additional advantages are provided due to the "soft" optics nature of these products. One such advantage is that the lenses will not shatter such as optics made from glass.

In addition, the method described above with reference to FIGS. 31 through 37 may be used to make lenses having shapes like Fresnel lenses. This type of lens has a rather large size; however, the thickness is not great. Fresnel type lenses can be used in a variety of applications. For example, a diverging Fresnel lens product is commercially available and is intended to be positioned on the back window of a vehicle. Because this is a "soft" lens, it can be applied to surfaces, such as the back window of the vehicle, without adhesives. It is therefore easily removed from the applied surface.

The ability to produce conventional lenses of any shape in a cost effective manner is attractive to manufacturers of a wide array of products. For example, many toy producers have product lines that incorporate some type of conventional lens into the product. These products range from simple beginner microscopes and simple goggles to more complex optical containing products. The present lens manufacturing methods can be used to produce complex optical components, such as camera/video objectives. In addition, it is possible to realize switchable objectives for disposable cameras even those having wide angles. Currently, the disposable cameras that are commercially available are not entirely disposable as the objectives of the camera are typically reused. Using elastomeric lenses not only reduces the cost of the product but also makes the product completely disposable. Moreover, the ability to produce objectives for panoramic pictures at reasonable prices is very appealing.

Figure 46:
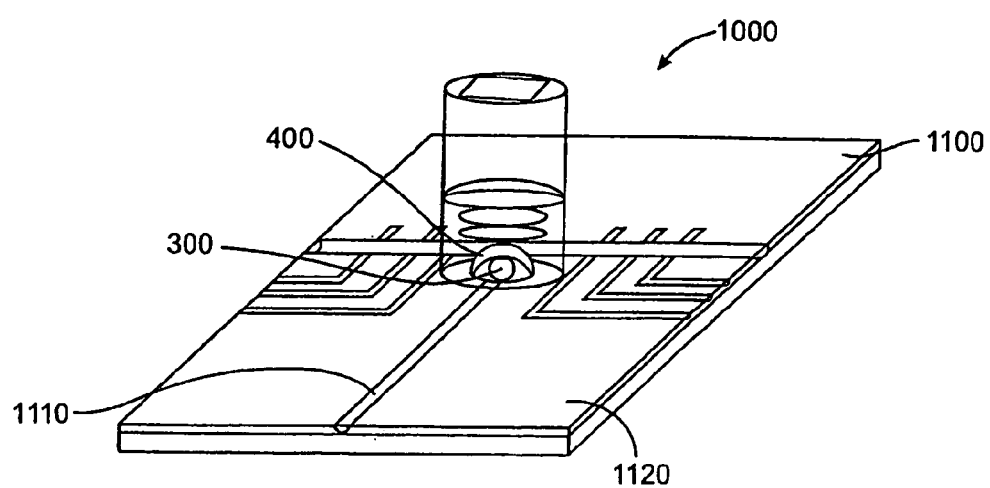
FIG. 46 shows a perspective view of a microfluidic device having an integrated imaging system.

Other application areas for these lenses manufactured according to the present methods are in areas such as scanners or video/retroprojectors that are very expensive and may suffer from the cost of the optical elements used. For example, this includes the very large lenses that are used for a videoprojector. Referring now to FIG. 46, one exemplary use of an optical system incorporating the SIL structure 300 by itself or in combination with the meniscus type lens 400 is in an integrated imaging system, such as the miniature microscope 1000 that forms a part of an integrated micro-sized workstation 1100, e.g., a microfluidic device or chip. For purpose of illustration only, the miniature microscope of FIG. 46 is the same one that is described in detail with reference to FIG. 30. However, only the upper portion of the miniature microscope 1000 above the SIL structure 300 is shown in FIG. 46. It will be appreciated that the bottom portion, i.e., the portion below the SIL structure 300, is not shown but lies beneath the microfluidic chip 1100. Because the microfluidic chip 1100 and the SIL structure 300 can be formed of the same materials, it will be appreciated that the SIL structure 300, along with other components of the miniature microscope 1000, can be integrally formed as part of the microfluidic chip 1100.

In the illustrated embodiment, the microfluidic chip 1100 has a number of channels 1110 formed in an upper surface 1120 thereof. The integrated micro-sized microscope 1000 is selectively positioned on the upper surface 1120; however, for purpose of illustration only the size of the microscope 1000 has been exaggerated. Some of the details of the microfluidic chip 1100 have also been exaggerated for purposes of illustrating how the microscope 1000 is used in combination with the microfluidic chip 1100 according to this exemplary application. In one exemplary embodiment, the SIL 300 has a lens portion with a 150 microns radius and the total height of the microscope 1000 is about 10 cm.

One or more of the channels 1130 carry a sample to be analyzed and the microscope 1000 is aligned with at least one of these channels 1130 for detection of the sample. Accordingly, the SIL 300 is aligned with respect to the channel 1130 carrying the sample. Experiments are then carried out on the microfluidic chip 1130 in a conventional manner by operating the imaging system 1000 in a traditional manner.

The integrated microscope 1000 is positioned on the upper surface 1120 using any number of suitable techniques designed for placement and alignment of objects according to a micro scale. For example, the integrated microscope 1000 may be attached to the upper surface 1120 by using tweezers under microscope observation, whereby the SIL structure 300 is aligned with respect to the sample area of interest. Once aligned, the SIL structure 300 is bonded or otherwise attached to the upper surface 1120. For example, it can be bonded by plasma treatment or off ratio elastomer combination. Following the placement of the SIL structure 300, the meniscus type lens 400 is applied in the same manner. In other words, the meniscus type lens 400 is aligned with the SIL 300 and then attached thereto, thereby ensuring optical alignment. Alternatively, the meniscus type lens 400 may be aligned with and attached to the SIL 300 to form a single integrated structure which is then positioned and attached to the upper surface 1120 in the manner described above. The other components of the integrated microscope 1000 can be properly positioned and attached using these same techniques.

Advantageously, the use of the SIL lens structure 300 improves the imaging performance of the microscope and this performance is further enhanced by using the meniscus type lens 400 in combination with the SIL lens structure 300. For example, the microfluidic chip 1100 can be used in experiments for detection and sorting of cells which are on the order of 2 microns long and 1 micron large. Using ordinary imaging devices having lower NA values, the cells are not visible even when the power of the light source (e.g., LED) is increased. Thus, without a high NA aperture microscope, no sorting can be achieved. When the SIL lens structure 300 is used, the cells appear clearly; however the signal is still weak enough to prevent an efficient sorting due to noise of the CMOS. The meniscus type lens 400 is used for increasing the intensity collected. By adding the meniscus type lens 400, the cells are magnified by a factor of about 2 and the cells have sufficient intensity that permits them to be sorted. The electric signal coming out of the CMOS can be analyzed.

In sum, the SIL lens structure 300 by itself or in combination with the meniscus type lens 400 provides optical coupling to devices or samples within microfluidic or microelectronic chips or devices, such at the chip 1100, at higher efficiencies and lower cost than which is achievable with conventional techniques while at the same time reducing the mechanical complexity of the instrument portion of the device. Integrated lenses provide the opportunity to achieve lower instrument cost by eliminating the need for expensive conventional high numerical aperture (NA) objective lenses while greatly simplifying the problem of alignment of external optical systems to microfabricated devices, such as channels, cavities, sample wells, optical sources, and detectors. Optical alignment is simplified because the optical beam diameter emerging from an integrated optic is much larger than actual detection and is related to the light collection ability (or NA) of the integrated optical element(s). Alignment tolerance will necessarily be related to a percentage of the emerging beam diameter for an integrated optic or the actual sample size for an externally aligned optical system.

An SIL or mensicus type combination lens provides high numerical aperture (NA) to and from an electro-optic device fabricated within a semiconductor or microfluidics chip or any other suitable structure capable of incorporating optical sources and detectors, such as LEDs, laser diodes, photodiodes, avalanche photodiodes, or any other type of light source or detector. High numerical aperture (NA) coupling is beneficial for coupling light from samples since the collection efficiency is proportional to $NA^4$ for fluorescence detection and $NA^2$ for luminescence detection.

The SIL structure 300 and/or the meniscus type lens 400 (or an array of such lenses) as described previously herein can be fabricated in a planar layer which is bonded to a surface. Alignment marks or features can be fabricated in the same layer as the lens and be optically or mechanically aligned to optical or mechanical features on the surface. Precise optical alignment is required when the source of light or detector is small, such as a small sample volume contained within a microfluidics detection region residing within a microfabricated channel or small integrated LED residing in a microelectronic chip.

When fabricating devices with soft materials, such as plastics or elastomers, significant distortions on a global scale can result due to material non-uniformities and other non-uniformities and strains which might occur as a result of the manufacturing process. The use of global alignment marks may not result in the level of precision needed for alignment of lenses to small targets. Since precise alignment can easily be maintained over short distances using local alignment marks, it may be desirable to break large lens arrays on a single chip or lens arrays covering multiple chips on a large wafer into smaller sub-arrays. Aligning a separate lens array or sub-array to each chip on a wafer, with local alignment, can maintain precise alignment despite large distortions on a global scale.

A SIL structure 300 with or without the meniscus type lens 400 can provide high numeral aperture (NA) optical coupling to and from a sample contained in a microfabricated structure, such as a channel, cavity, well, or device fabricated within a microfluidic chip. These lenses or a lens array can be either integrated into the structure of the chip or be incorporated into the chip reading instrument. If incorporated into the instrument, means must be provided to position the chip so as to bring the lens array into proper alignment (in X, Y, Z) with the array of detection sites prior to reading. Light from the lens array can be coupled into a CCD or an array of CCDs to allow simultaneous reading of all detection zones in the chip. This optimizes the number of photons that can be collected in the shortest measurement time and allowed information to be simultaneously collected from spatially separated regions on the chip. A optically dispersive element such as a grating can be included in the optical path to allow spectral discrimination or simultaneous measurements at multiple wavelengths, Means can be provided to incorporate total internal reflection measurements as well as surface plasmon resonance measurements.

While integrating the lens array into the chip optimizes the numerical aperture, simplifies the mechanics of the instrument, and reduces the need for precise opto-mechanical alignment between the chip and the instrument, extra cost is added to the disposable chip. This extra costs can add up to significant amounts when large numbers of chips are used for screening application or other similar applications. Alternatively, if the lens array is incorporated into the instrument, the numerical aperture (NA) will be lower but the cost of the instrument will still be lower than what it otherwise would be if conventional optics were used instead of the SIL lens structure 300, meniscus type lens 400, or a combination thereof. An instrument designed using SIL or meniscus type lens combination lens arrays, offers significant performance advantages over conventionally designed instruments. Such a lens system facilitates optical coupling to a CCD which is capable of simultaneously observing multiple detection regions.

Figure 47:
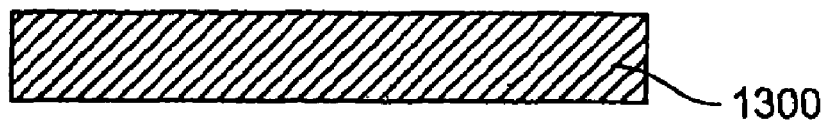
FIG. 47 shows a cross-sectional of an initial step in a method for producing an array of molded lenses.
Figure 48:
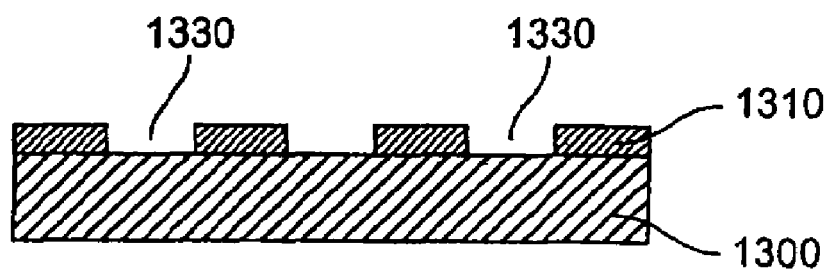
FIGS. 48-52 show cross-sectional views illustrating further steps for producing the array of molded lenses after the step of FIG. 47 is performed.

In yet another embodiment, an array of SIL lenses is provided and a method of manufacturing the array is described with reference to FIGS. 47 through 53. Referring to FIG. 47, a planar substrate 1300 made of a suitable rigid material is provided. In an exemplary embodiment, the substrate 1300 is a silicon wafer on which a photoresist layer 1310 of predetermined thickness is provided. One preferred thickness for the photoresist layer 1310 in the fabrication of the array of SIL lenses satisfies the relation (v) H>=r(1-1/n)+h$_2$, where r is the radius of the mold core 1320 (FIG. 49), n is the index of refraction of the material which forms the finished optical element, and h$_2$ is the thickness of the body portion as shown in FIG. 7. Using standard lithography procedures, wells 1330 of predetermined diameter D are defined in the photoresist layer 1310 as shown in FIG. 48. The wells 1330 are formed according to any number of predetermined patterns. One preferred diameter D satisfies the relation (VI) D=2×r×sin(arcos (1/n−h$_2$/r).

Figure 49:
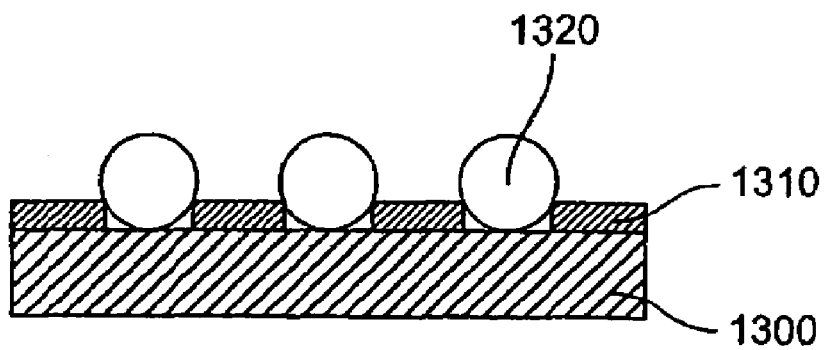
Figure 50:
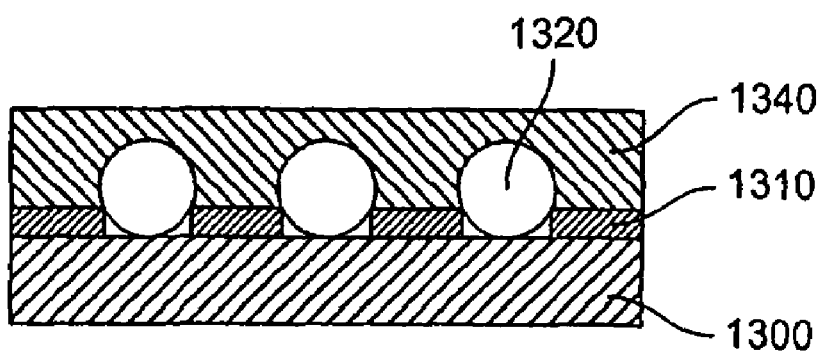
Figure 51:
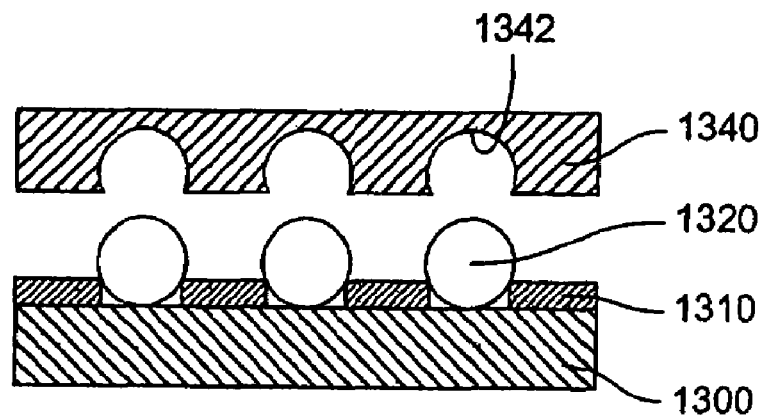
Figure 52:
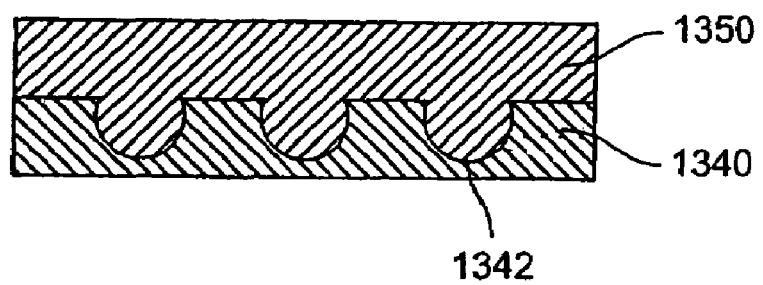

Referring to FIG. 49, mold cores 1320 are then set into the wells 1330. The mold cores 1320 can be formed of sapphire, ruby, or steel and are in the form of spheres. The mold cores 1320 rest on the substrate 1300 with the photoresist layer 1310 contacting the mold cores 1320 at select points. The exposed surfaces of the mold cores 1320 and the photoresist layer 1310 form a well-defined boundary. The greater the mold cores 1320 protrude above the photoresist layer 1310, the greater the undercut regions of the mold will be. To form the mold, a moldable material (e.g., silicon elastomer) is cast onto the surface defined by the protruding mold cores 1320 and the exposed photoresist layer 1310 to define a first layer 1340 as shown in. FIG. 50. Preferably care is taken so that small bubbles are not trapped in crevices at the intersection of the mold cores 1320 and the photoresist layer 1310. One preferred method for their removal is placing the entire structure into a vacuum for minutes. The thickness of layer 1340 should completely submerge the mold cores 1320 and supply mechanical stiffness. Once the layer 1340 is set by curing, the layer 1340 is removed along with the mold cores 1320 and the layer 1340 is treated with oxygen plasma. The layer 1340 has a series of defined cavities 1342.

Figure 53:
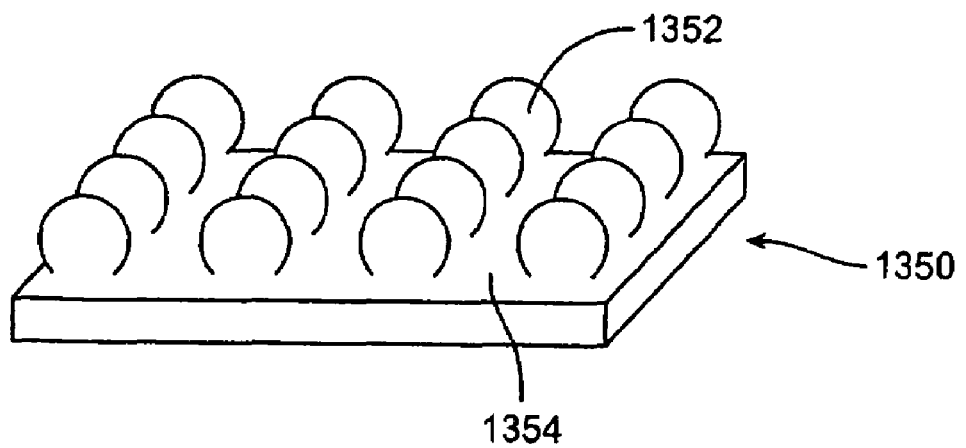
FIG. 53 shows a perspective view of an array of molded lenses produced according to the method of FIGS. 47-52.

The mold (first layer 1340) is inverted and a moldable material from which the array of SIL lenses it to be formed is cast onto the first layer 1340 so that the moldable material not only fills the cavities 1342 but also fills the areas between the cavities 1342 so as to form the connecting body portion of the array. This moldable material forms a second layer 1350. In one embodiment, the entire structure is placed in a standard spinner so as to control the thickness of the body portion. FIG. 53 shows the removal of the second layer 1350 from the mold. The second layer 1350 is in the form of an array of SIL lenses having spherical lens portions 1352 and an integral body portion 1354 extending therebetween. The mold can be reused.

A significant advantage of this method of fabrication is that is does not require the precise of surface control, since the mold profile will now conform to the surface defined by the combination of the mold cores 1320 and the photoresist layer 1310. This method is applicable to production of a regular array of closed spaced lenses such as might be necessary in the production of a CCD array. Additionally, precision placement of lenses which have a definite spatial relation among them may also be used in an application where optical illumination and interrogation may be necessary in a number of distinct positions on a microfluidic chip or similar device.

The following example further illustrates the advantages provided by the SIL lens structure 300. It will be understood that the following example is merely exemplary and not limiting.

EXAMPLE 3

Figure 54:
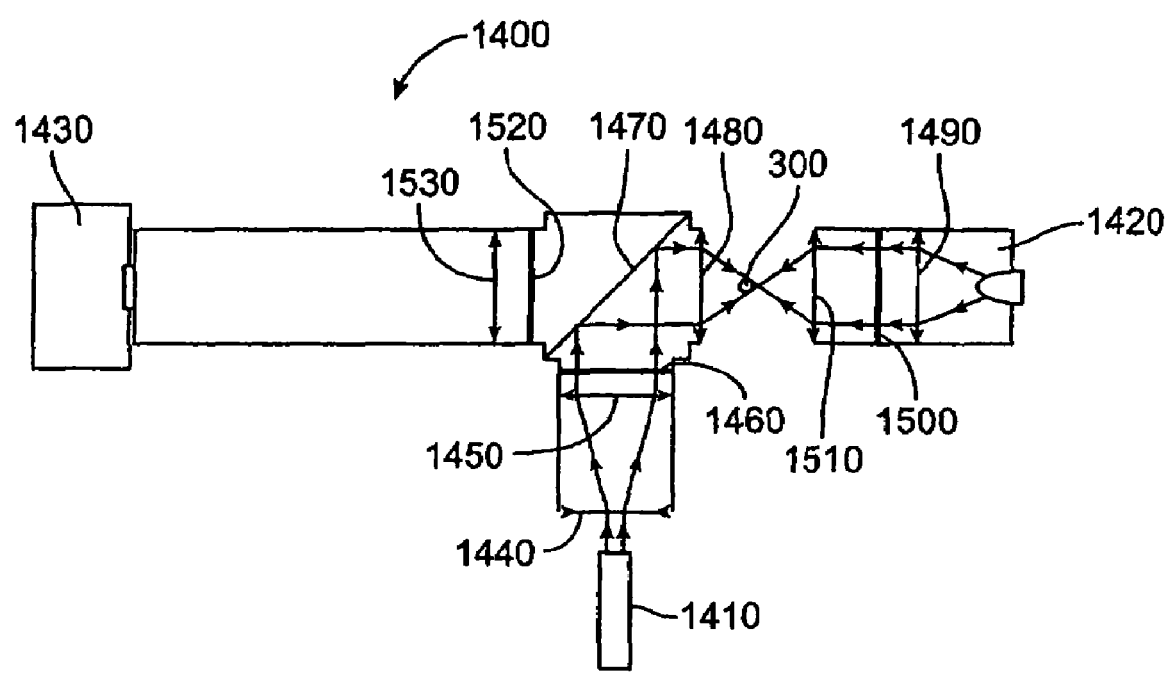
FIG. 54 shows a schematic diagram showing an exemplary imaging system incorporating an SIL lens.

By using one of the solid immersion lens structures disclosed herein, the numerical aperture (NA) of the optical system may be increased to a value that is otherwise not obtainable using-conventional lenses. FIG. 54 illustrates how the NA is increased using a solid immersion lens. An optical system 1400 is illustrated and in the exemplary embodiment, the system 1400 is a fluorescent microscope arrangement. The set of filters is chosen according to the dyes used in the different experiments (blue excitation and green emission). A laser 1410 is used to create the excitation and in this instance the laser 1410 is a blue laser having a wavelength of 488 nm and a beam diameter of 1 mm. A number of companies manufacture lasers having these characteristics and one exemplary laser 1410 is a Uniphase 2214-10 SL Argon Laser. The excitation may also be created by a blue LED 1220, e.g., Luxeon Star/C.

The filter set is selected in view of the excitation wavelength (coming from the laser 1410 or the blue LED 1420 and allows only the fluorescent emission to be focused on an image detector 1430, such as a CCD camera. The beam of the laser 1410 is increased with first and second lenses 1440, 1450, respectively. The lenses 1440, 1450 have a diameter of 1.9 cm and focal lengths of −2 cm and 4 cm, respectively. The beam is then filtered by an excitation filter 1460 (wavelength of 465 nm to 495 nm) and is reflected by a dichroic filter 1470 towards a lens 1480 that focuses the beam on the solid immersion lens 300. It will be appreciated that the solid immersion lens 300 is formed according to one of the molding methods disclosed herein. In one exemplary embodiment, the lens 1480 has a diameter of 1.9 cm and a focal length of 1.15 cm. The lens 1480 is chosen that the initial NA, with the SIL 300, is high (NA=0.65). The blue LED 1420 is arranged so that it is the focal point of a first lens 1490 (diameter 1.9 cm and focal length 3 cm) so that the excitation is able to filtered by an excitation filter 1500 (wavelength 470 nm to 490 nm). A second lens 1510 (diameter 1.9 cm and focal length 1.15 cm) is arranged to focus the rays on the passage (i.e., observation region 310 of FIG. 7) under the lens portion of the SIL 300.

Figure 55:
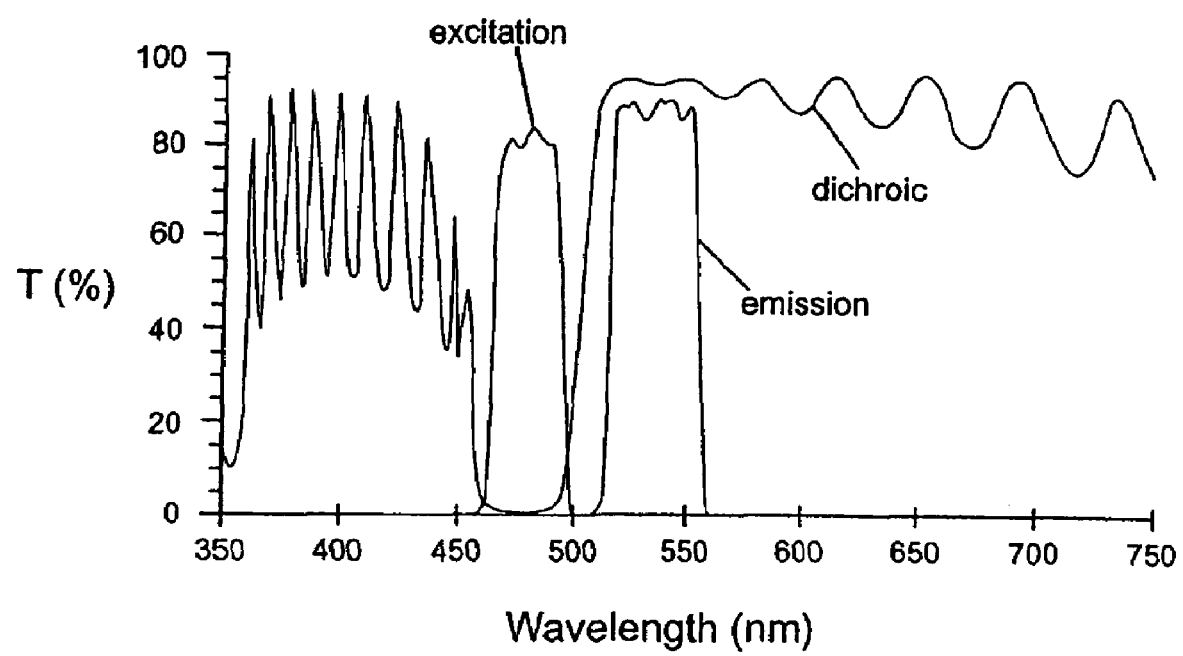
FIG. 55 shows a graph showing the excitation range and emission range of the system of FIG. 54.

FIG. 55 illustrates the excitation wavelength of the above-described set of lenses which is selected to allow only the fluorescent emission to be focused on a CCD camera or the like.

When the SIL structure 300 is put over an RTV chip (not shown) where flourescent components are flowing inside a channel formed therein and having exemplary dimensions of 1 cm length, 20 microns width, and 5 microns deep. In this example, the reflective index of the solution is n=1.3 (therefore 1.3 is the largest numerical aperture that can be used without evanescent field).

The SIL structure 300 has to collect as much emission light as possible. This emission light is not reflected by the dichroic filter because this one reflects the light below 505 nm, but lets green light (beyond 505 nm) go through. The emission light is finally filtered by an emission filter (515 nm to 555 nm) 1520 and is focused by a lens 1530 (f=17.5 cm) on the CCD camera 1430 (Philips Image Sensor Module FTM 800).

In order to measure the numerical aperture, fluorescent beads (Interfacial Dynamics Corporation 2-FY-1K.2) of diameter 5 microns, an excitation wavelength of 490 nm, an emission wavelength of 515 nm, a concentration of $2 \times 10^8$ beads per ml to measure the numerical aperture of the SIL structure 300.

Figure 56A:
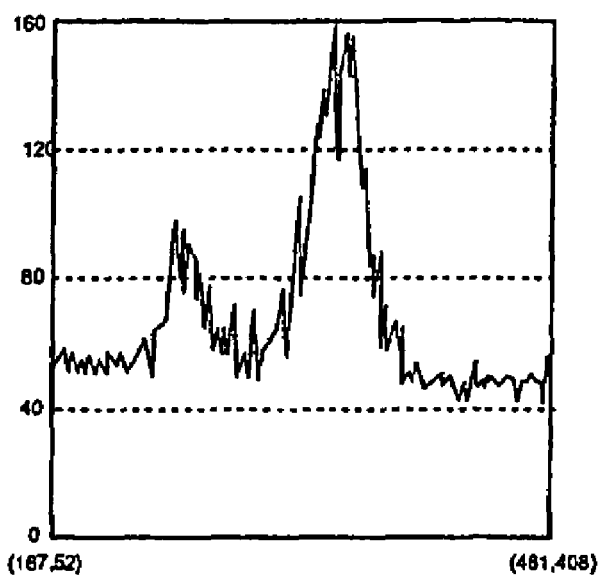
FIGS. 56A and 56B show light intensity profiles of samples when an SIL is used in the system of FIG. 54 and when it is not used.
Figure 56B:
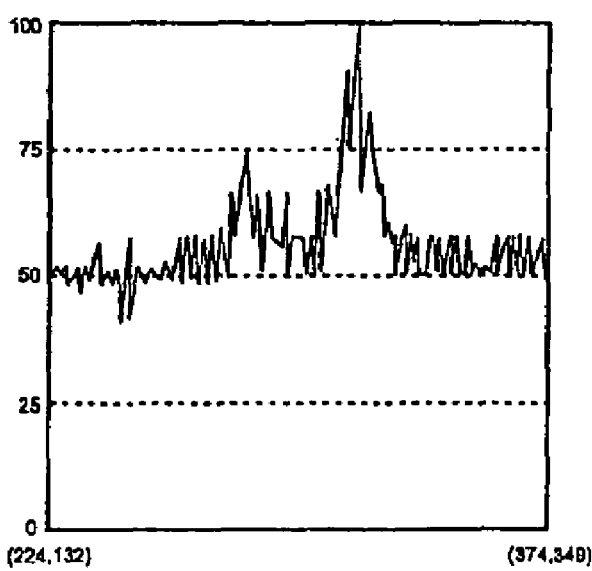

A wide range of SILs were used for this experiment, from a 2 mm radius SIL to a 395 microns radius SIL. There were absolutely no changes in the results. As shown in FIGS. 56A and 56B, the SIL 300 increases the intensity of the spot as shown in FIG. 56A (with SIL 300) and FIG. 56B (without SIL 300). The profile is measured in gray level, along a line passing through the centers of the two different beads. The light intensity of the beads is given by the area of the spot multiplied by the difference between the average intensity inside the spot and outside the spot.

Figure 57:
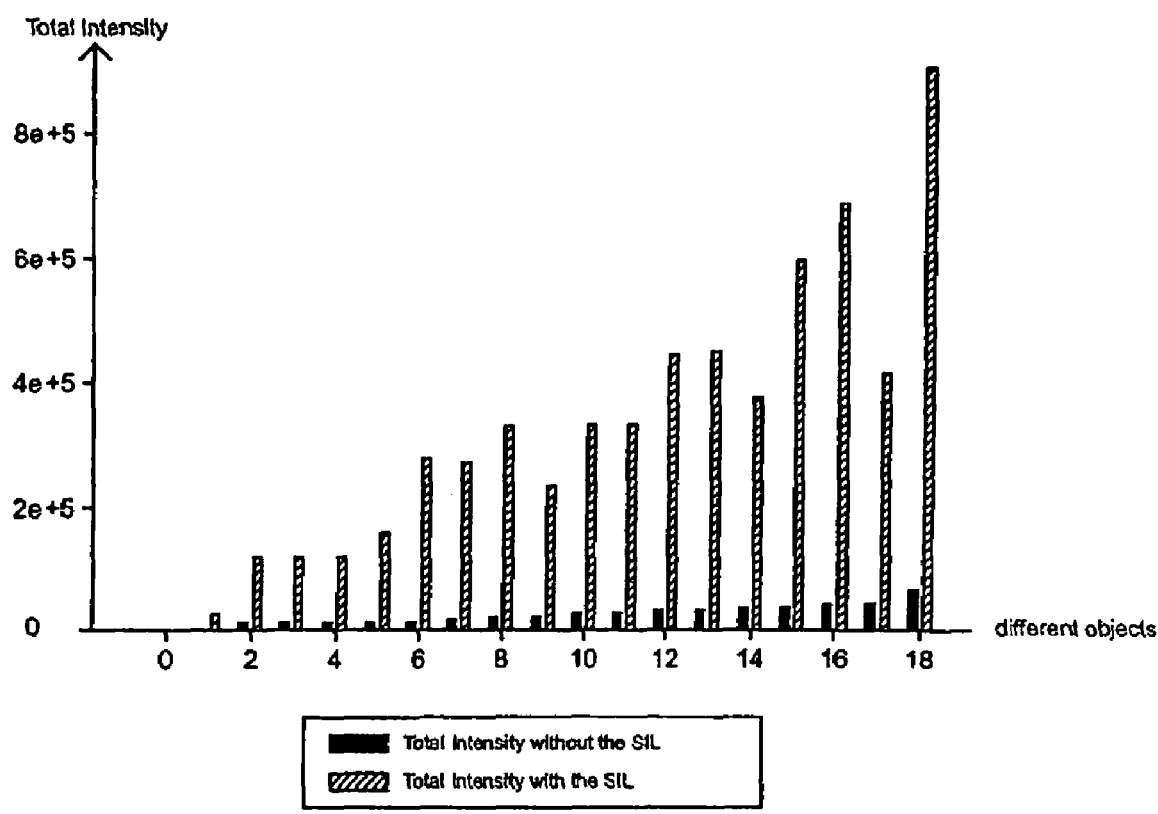
FIG. 57 shows a graph illustrating total intensity of the objects with and without the use of the SIL lens.

Pictures of the same beads were taken and their place of the device was determined and then the light intensities of the spots was compared. Changing the light intensity of the illumination, permits a wide spectrum of initial intensity to be achieved in order to demonstrate that the efficiency of the SIL 300 does not depend on the brightness of the objects. FIG. 57 shows the results. The ratio of the intensity with and without the SIL 300 leads to the ratio of the numerical apertures with and without the SIL 300. The relation (VII) is:

$$NA_{with\ SIL}/NA_{with\ SIL} = (\text{Intensity with the SIL/Intensity without the SIL})^{1/4}$$

Figure 58:
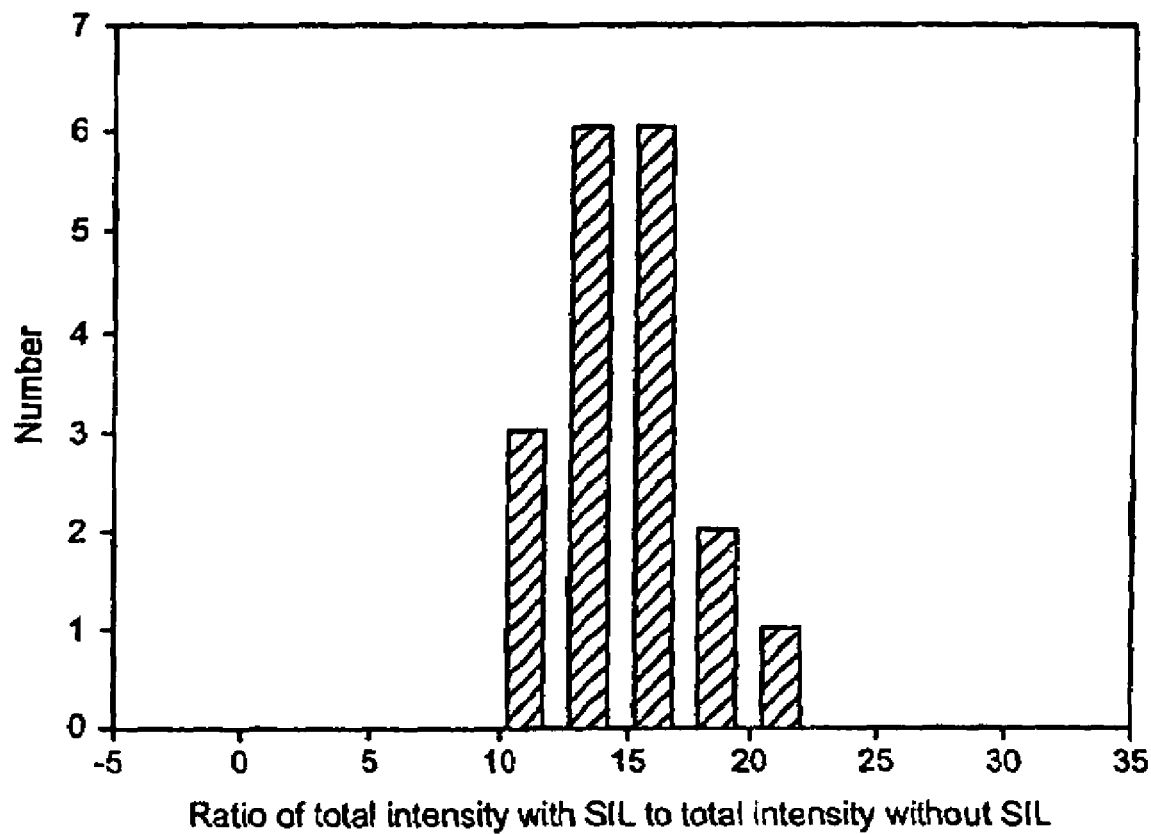
FIG. 58 shows a graph illustrating the average ratio of two light intensities.

The average of the two intensities is equal to 13.35+/−0.53 as shown in FIG. 58. The initial numerical aperture without the SIL, is 0.63, so the numerical aperture is NA=1.25+/−0.02. This illustrates the increase in NA.

While the invention has been particularly shown and described with reference to preferred embodiments thereof, it will be understood by those skilled in the art that various changes in form and details may be made therein without departing from the spirit and scope of the invention.

What is claimed is:

1. A microfluidic chip comprising:
 a substrate having one or more channels formed in a surface thereof;
 an imaging system including a microscope arrangement including a lens system comprising:
 a solid immersion lens having a spherical solid immersion lens portion and a body portion from which the solid immersion lens portion extends, at least the solid immersion lens portion being of a molded material; and
 a meniscus type lens having a meniscus lens portion and a body portion from which the meniscus lens portion extends, at least the meniscus lens portion being of a molded material, the meniscus lens portion being defined by a convex surface and a concave surface, the concave surface being positioned about the spherical solid immersion lens portion in spaced relation thereto, the body portion of the meniscus type lens being supported in fixed position relative to the body portion of the solid immersion lens.

2. The microfluidic chip of claim 1, wherein the solid immersion lens is integrally connected to an upper surface of the substrate, the lens portion of the solid immersion lens being aligned with one of the channels for imaging a sample in the one channel.

3. The microfluidic chip of claim 1, wherein the microscope arrangement has a height of about 10 cm.

* * * * *